United States Patent
Nandanwar et al.

(10) Patent No.: US 12,488,857 B2
(45) Date of Patent: Dec. 2, 2025

(54) STATIC RANDOM ACCESS MEMORY (SRAM) FAULT CORRECTION

(71) Applicant: QUALCOMM Incorporated, San Diego, CA (US)

(72) Inventors: Darshan Kumar Nandanwar, Bangalore (IN); Kartik Gunvantbhai Desai, Savarkundla (IN); Raghava Rao M V, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 202 days.

(21) Appl. No.: 18/466,110

(22) Filed: Sep. 13, 2023

(65) Prior Publication Data

US 2025/0087295 A1    Mar. 13, 2025

(51) Int. Cl.
*G11C 29/00*    (2006.01)
*G11C 7/10*    (2006.01)

(52) U.S. Cl.
CPC ............ *G11C 29/76* (2013.01); *G11C 7/1012* (2013.01); *G11C 29/785* (2013.01)

(58) Field of Classification Search
CPC ...... G11C 29/76; G11C 7/1012; G11C 29/785
See application file for complete search history.

(56) References Cited

U.S. PATENT DOCUMENTS

| 8,717,838 B1 * | 5/2014 | Mishi | G11C 29/70 365/201 |
| 2012/0260148 A1 * | 10/2012 | Hughes | G11C 29/789 714/E11.055 |
| 2013/0083612 A1 * | 4/2013 | Son | G11C 29/4401 365/200 |
| 2015/0117083 A1 * | 4/2015 | Son | G11C 29/04 365/96 |

* cited by examiner

*Primary Examiner* — Han Yang
(74) *Attorney, Agent, or Firm* — Norton Rose Fulbright US LLP

(57) ABSTRACT

This disclosure provides systems, methods, and devices for memory systems that support SRAM fault correction. In a first aspect, a method includes receiving, by a memory controller coupled to a memory module through a first channel and configured to store data in and access data stored in the memory module through the first channel from a host device, data to be stored in a memory of the memory module, determining, by the memory controller, a row in the memory at which the data will be stored, determining, by the memory controller based on the row, an address associated with the row, wherein the address indicates one bit location in the row at which data will not be stored, and storing, by the memory controller, the data at the row in accordance with the address, wherein the data is not stored at the one bit location.

28 Claims, 14 Drawing Sheets

| Row# | Spare Cl | Cl3 | Cl2 | Cl1 | Cl0 |
|---|---|---|---|---|---|
| 0 | E | D | C | B | A |
| 1 | E | D | C | B | A |
| 2 | E | D | C | B | A |
| 3 | E | D | C | B | A |

Structure 440

FIG. 4C

STATIC RANDOM ACCESS MEMORY (SRAM) FAULT CORRECTION

TECHNICAL FIELD

Aspects of the present disclosure relate generally to computer information systems, and more particularly, to memory systems for storing data. Some features may enable and provide improved memory capabilities for fault correction in SRAM.

INTRODUCTION

A computing device (e.g., a laptop, a mobile phone, etc.) may include one or several processors to perform various computing functions, such as telephony, wireless data access, and camera/video function, etc. A memory system is an important component of the computing device. The processors may be coupled to the memory system to perform the aforementioned computing functions. For example, the processors may fetch instructions from the memory system to perform the computing functions and/or to store within the memory system temporary data involved in performing these computing functions.

Various types of memory may be included in memory systems for computing devices. One example memory type is static random access memory (SRAM). SRAM is a type of random access memory (RAM) that uses latch circuitry for storage. SRAM may hold data stored therein indefinitely, while power is provided. During production, SRAM may encounter faults, leading to presence of bad bit storage locations, which may be referred to as bit cells. As one example, faults in bit storage locations may result in such locations requiring a higher minimum voltage than other bit storage locations of the SRAM for operation. Bit storage location faults may reduce the operating efficiency of SRAM, for example by requiring SRAM to operate at higher voltages to keep bit error rates (BERs) of the SRAM within particular parameters, leading to increased power consumption and/or reduced battery life of devices that include SRAM.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, an SRAM memory may include a spare column for bypassing one faulty bit location per row. In some aspects, a row, as described herein, may correspond to a particular way or a particular set including multiple ways. Bypassing of faulty bit locations may be accomplished through use of an adaptive column reuse (ACR) technique. For example, when reading data from or storing data to a row of the SRAM memory, such as to a row of a data array of the SRAM, a memory controller may determine a redundancy address (RA) associated with the row of the SRAM memory. Using the RA, the controller may bypass up to one bad bit location for each row of the memory. A line bypass indication, such as a line disable indication, may be used to indicate that one or more entire rows of the memory should not be used, such as when a row includes more than a single faulty bit location. RAs, which may also be referred to as adaptive column reuse addresses (ACRAs), and/or line bypass indications may be stored in a tag array of the SRAM, which may be referred to as tag RAM. The tag array may be included in the SRAM, separate from a portion of the SRAM used for data storage. Faulty bit locations in the tag array may be corrected through use of a bit bypass technique to bypass faulty bits in the tag array. A bit bypass technique may include storage of repair bits corresponding to faulty bit locations of the tag array in a repair array, such that a corresponding bit location of the repair array may be accessed in place of a faulty bit location of the tag array.

The SRAM fault correction techniques described herein may enhance operation of computing devices that include SRAM memory, through reduced power consumption and enhanced reliability. The techniques described herein may also enhance SRAM production yields, reducing the cost of SRAM production. For example, use of a spare column in SRAM data storage along with corresponding RAs indicating up to one faulty bit in each row that should be bypassed may reduce a required operating voltage of the SRAM by allowing a lower minimum voltage to be supplied through bypassing faulty bit locations in the memory. Further, use of the spare column along with corresponding RAs may increase SRAM chip production yields by allowing for bypassing of single faulty bit locations, thus allowing for chips with a higher bit error rates (BERs) to remain usable and reducing a cost of production resulting from faulty chips. As one particular example, up to and exceeding a 20% reduction in a minimum operating voltage can be obtained while tolerating a $9.5 \times 10^{-5}$ bit error rate (BER) with an increase in area overhead of approximately 0.6% using a single spare bit per set implementation or tolerating a $38 \times 10^{-5}$ BER with a 1.2% increase in area overhead using a single spare bit per way implementation for 5-nanometer nodes. Use of line bypass indications may reduce power consumption and enhance SRAM chip production yields for similar reasons. Likewise, use of bit bypass techniques in tag arrays may reduce power consumption and enhance SRAM chip production yields by allowing for bypass of faulty bits in a tag array section of the SRAM. As another particular example, use of ACR, line bypass, and bit bypass techniques described herein may result in an SRAM power consumption reduction of up to and exceeding 36% for per level caches. Use of ACR may cause a latency degradation of one cycle, to allow for shifting of cell values according to the ACRAs for read and store operations, which may have a minimal impact on performance. Bit bypass techniques described herein may be pipelined to occur in parallel with tag search, providing power consumption reduction and yield benefits with minimal performance degradation.

These aspects may be embodied as a sequence of commands transmitted from a host to a memory system and/or a sequence of commands executed by a controller of a memory system. The commands transmitted by the host may include commands to read capabilities from the memory system, set configurations in the memory system, read data at one or more specified addresses from the memory system, and/or write data at one or more specified addresses to the memory system.

An apparatus in accordance with at least one embodiment includes a memory system configured to communicate with a host. The memory system includes a memory array configured to store data. The memory system may include a memory controller configured to provide the data stored in the memory array to the host for further processing by the processor or other components of the host. The memory controller may also be configured to receive data from the host for storage in the memory array. In some embodiments, the memory array may be a plurality of volatile memory cells organized in rows and columns, such as in a SRAM. In other embodiments, the memory array may be a plurality of non-volatile memory cells or a mixture of volatile and non-volatile memory cells.

An apparatus in accordance with at least one other embodiment includes a host device with a memory controller configured to communicate with a memory system to receive data stored in the memory array and/or to store data in the memory array. The host device may be, for example, a user equipment (UE) device such as a cellular phone, a tablet computing device, a personal computer, a server, a smart watch, or an internet of things (IoT) device.

In one aspect of the disclosure, a method for SRAM fault correction includes receiving, by a memory controller coupled to a memory module through a first channel and configured to store data in and access data stored in the memory module through the first channel from a host device, data to be stored in a memory of the memory module, determining, by the memory controller, a row in the memory at which the data will be stored, determining, by the memory controller based on the row, an address associated with the row, wherein the address indicates one bit location in the row at which data will not be stored, and storing, by the memory controller, the data at the row in accordance with the address, wherein the data is not stored at the one bit location.

In an additional aspect of the disclosure, an apparatus includes at least one processor and a memory coupled to the at least one processor. The at least one processor is configured to perform operations including receiving, from a host device, data to be stored in a memory of the memory module, determining a row in the memory at which the data will be stored, determining, based on the row, an address associated with the row, wherein the address indicates one bit location in the row at which data will not be stored, and storing the data at the row in accordance with the address, wherein the data is not stored at the one bit location. The processor may be a processor, controller, or other logic circuitry in a memory system. For example, the processor may be a controller embedded in a memory device. In some aspects, the processor may be a memory controller coupled to a memory module through a first channel and configured to store data in and access data stored in the memory module through the first channel. The memory controller may be configured to perform the operations described herein.

In an additional aspect of the disclosure, an apparatus includes means for receiving, by a memory controller coupled to a memory module through a first channel and configured to store data in and access data stored in the memory module through the first channel from a host device, data to be stored in a memory of the memory module, means for determining, by the memory controller, a row in the memory at which the data will be stored, means for determining, by the memory controller based on the row, an address associated with the row, wherein the address indicates one bit location in the row at which data will not be stored, and means for storing, by the memory controller, the data at the row in accordance with the address, wherein the data is not stored at the one bit location.

In an additional aspect of the disclosure, a method for SRAM fault correction includes receiving, by a memory controller coupled to a memory module through a first channel and configured to store data in and access data stored in the memory module through the first channel from a host device, a request to read data stored in a memory of the memory module, determining, by the memory controller a row in the memory at which the data is stored, determining, by the memory controller based on the row, an address associated with the row, wherein the address indicates one bit location in the row at which the data is not stored, and reading, by the memory controller, the data at the row in accordance with the address, wherein the data is not stored at the one bit location.

In an additional aspect of the disclosure, an apparatus includes at least one processor and a memory coupled to the at least one processor. The at least one processor is configured to perform operations including receiving, from a host device, a request to read data stored in a memory of the memory module, determining a row in the memory at which the data is stored, determining, based on the row, an address associated with the row, wherein the address indicates one bit location in the row at which the data is not stored, and reading the data at the row in accordance with the address, wherein the data is not stored at the one bit location. The processor may be a processor, controller, or other logic circuitry in a memory system. For example, the processor may be a controller embedded in a memory device. In some aspects, the processor may be a memory controller coupled to a memory module through a first channel and configured to store data in and access data stored in the memory module through the first channel. The memory controller may be configured to perform the operations described herein.

In an additional aspect of the disclosure, an apparatus includes means for receiving, by a memory controller coupled to a memory module through a first channel and configured to store data in and access data stored in the memory module through the first channel from a host device, a request to read data stored in a memory of the memory module, means for determining, by the memory controller a row in the memory at which the data is stored, means for determining, by the memory controller based on the row, an address associated with the row, wherein the address indicates one bit location in the row at which the data is not stored, and means for reading, by the memory controller, the data at the row in accordance with the address, wherein the data is not stored at the one bit location.

In an additional aspect of the disclosure, an apparatus, such as a wireless device, includes at least one processor and a memory coupled to the at least one processor. The at least one processor is configured to communicate with the memory system through a memory controller coupled to a channel that couples the processor to the memory system. The processor may be a processor, controller, or other logic circuitry in a host.

In an additional aspect of the disclosure, a non-transitory computer-readable medium stores instructions that, when executed by a processor, cause the processor to perform operations described herein regarding aspects of the disclosure.

Memory systems in the present disclosure may be embedded within a processor on a semiconductor die or be part of a different semiconductor die. The memory systems may be of various kinds. For example, the memory may be static random access memory (SRAM), dynamic random access memory (DRAM), magnetic random access memory (MRAM), NAND flash, or NOR flash, etc.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections. The processor may be coupled to the first network adaptor and a memory for storing data to support the processing and communications operations performed by the processor. The network adaptor may support communication over a wireless communications network such as a 5G NR communication network. The processor may cause the transmission of data stored in memory over the wireless communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4C shows an example chart of a data storage of an SRAM including multiple faulty bit locations according to one or more aspects of the disclosure.

Like reference numbers and designations in the various drawings indicate like elements.

DETAILED DESCRIPTION

Figure 1:
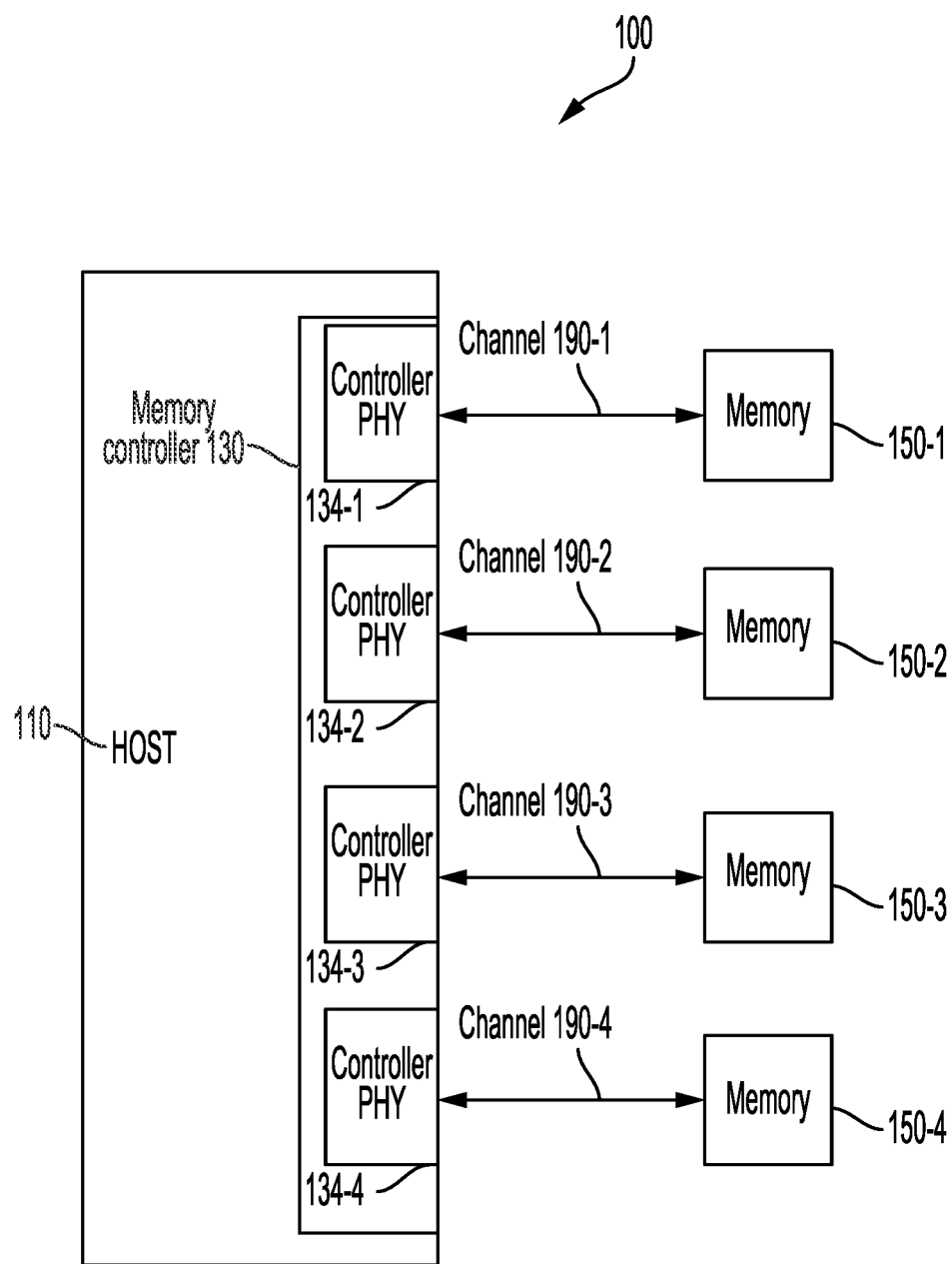
FIG. 1 shows a block diagram of an example computing system incorporating a host, memory system, and channels coupling the host and the memory system according to one or more aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

In some aspects, an SRAM memory may include a spare column for bypassing one faulty bit location per row. Bypassing of faulty bit locations may be accomplished through use of an adaptive column reuse (ACR) technique. For example, when reading data from or storing data to a row of the SRAM memory, such as to a row of a data array of the SRAM, a memory controller may determine a redundancy address (RA) associated with the row of the SRAM memory. Using the RA, the controller may bypass up to one bad bit location for each row of the memory. A line bypass indication, such as a line disable indication, may be used to indicate that one or more entire rows of the memory should not be used, such as when a row includes more than a single faulty bit location. RAs, which may also be referred to as adaptive column reuse addresses (ACRAs), and/or line bypass indications may be stored in a tag array of the SRAM, which may be referred to as tag RAM. The tag array may be included in the SRAM, separate from a portion of the SRAM used for data storage. Faulty bit locations in the tag array may be corrected through use of a bit bypass technique to bypass faulty bits in the tag array. A bit bypass technique may include storage of repair bits corresponding to faulty bit locations of the tag array in a repair array, such that a corresponding bit location of the repair array may be accessed in place of a faulty bit location of the tag array.

The SRAM fault correction techniques described herein may enhance operation of computing devices that include SRAM memory, through reduced power consumption and enhanced reliability. The techniques described herein may also enhance SRAM production yields, reducing the cost of SRAM production. For example, use of a spare column in SRAM data storage along with corresponding RAs indicating up to one faulty bit in each row that should be bypassed may reduce a required operating voltage of the SRAM by allowing a lower minimum voltage to be supplied through bypassing faulty bit locations in the memory. Further, use of the spare column along with corresponding RAs may increase SRAM chip production yields by allowing for bypassing of single faulty bit locations, thus allowing for chips with a higher bit error rates (BERs) to remain usable and reducing a cost of production resulting from faulty chips. As one particular example, up to and exceeding a 20% reduction in a minimum operating voltage can be obtained while tolerating a $9.5 \times 10^{-5}$ bit error rate (BER) with an increase in area overhead of approximately 0.6% using a single spare bit per set implementation or tolerating a $38 \times 10^{-5}$ BER with a 1.2% increase in area overhead using a single spare bit per way implementation for 5-nanometer nodes. Use of line bypass indications may reduce power consumption and enhance SRAM chip production yields for similar reasons. Likewise, use of bit bypass techniques in tag arrays may reduce power consumption and enhance SRAM chip production yields by allowing for bypass of faulty bits in a tag array section of the SRAM. As another particular example, use of ACR, line bypass, and bit bypass techniques described herein may result in an SRAM power consumption reduction of up to and exceeding 36% for per level caches. Use of ACR may cause a latency degradation of one cycle, to allow for shifting of cell values according to the ACRAs for read and store operations, which may have a minimal impact on performance. Bit bypass techniques described herein may be pipelined to occur in parallel with tag search, providing power consumption reduction and yield benefits with minimal performance degradation.

An example memory device that may incorporate aspects of this disclosure, including SRAM fault correction, is shown in FIG. 1. FIG. 1 illustrates an apparatus 100 incorporating a host 110, memories 150, and channels 190 coupling the host 110 and the memories 150. The apparatus 100 may be, for example, a device among computing systems (e.g., servers, datacenters, desktop computers), mobile computing device (e.g., laptops, cell phones, vehicles, etc.), Internet of Things devices, virtual reality (VR) systems, augmented reality (AR) systems, automobile systems (e.g., driver assistance systems, autonomous driving systems), image capture devices (e.g., stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities), and/or multimedia systems (e.g., televisions, disc players, streaming devices).

The host 110 may include at least one processor, such as central processing unit (CPU), graphic processing unit (GPU), digital signal processor (DSP), multimedia engine, and/or neural processing unit (NPU). The host 110 may be configured to couple and to communicate to the memories 150 (e.g., memories 150-1 to 150-4), via channels 190 (e.g., channels 190-1 to 190-4), in performing the computing functions, such as one of data processing, data communication, graphic display, camera, AR or VR rendering, image processing, neural processing, etc. For example, the memories 150-1 to 150-4 may store instructions or data for the host to perform the computing functions.

The host 110 may include a memory controller 130, which may include controller PHY modules 134-1 to 134-4. Each of the controller PHY modules 134-1 to 134-4 may be coupled to a respective one of the memories 150-1 to 150-4 via respective channels 190-1 to 190-4. For case of reference, read and write are referenced from a perspective of the host 110. For example, in a read operation, the host 110 may receive via one or more of the channels 190-1-190-4 data stored from one or more of the memories 150-1 to 150-4. In a write operation, the host 110 may provide via one or more of the channels 190-1-190-4 data to be written into one or more of the memories 150-1-150-4 for storage. The memory controller 130 may be configured to control various aspects, such as logic layers, of communications to and from the memories 150-1-150-4. The controller PHY modules 134-1-134-4 may be configured to control electrical characteristics (e.g., voltage levels, phase, delays, frequencies, etc.) of signals provided or received on the channels 190-1-190-4, respectively.

In some examples, the memories 150-1-150-4 may be LPDDR DRAM (e.g., LPDDR5, LPDDR6). In some examples, the memories 150-1-150-4 may be different kinds of memory, such as one LPDDR5, one LPDDR6, one Flash memory, and one SRAM, respectively. The host 110, the memories 150-1-150-4, and/or the channels 190-1-190-4 may operate according to an LPDDR (e.g., LPDDR5, LPDDR6) specification. In some examples, each of the channels 190-1-190-4 may include 16 bits of data (e.g., 16 DQs). In some examples, each of the channels 190-1-190-4 may operate on 32 bits of data (e.g., 32 DQs). In FIG. 1, four channels are shown, however the apparatus 100 may include more or less channels, such as 8 or 16 channels.

Figure 2:
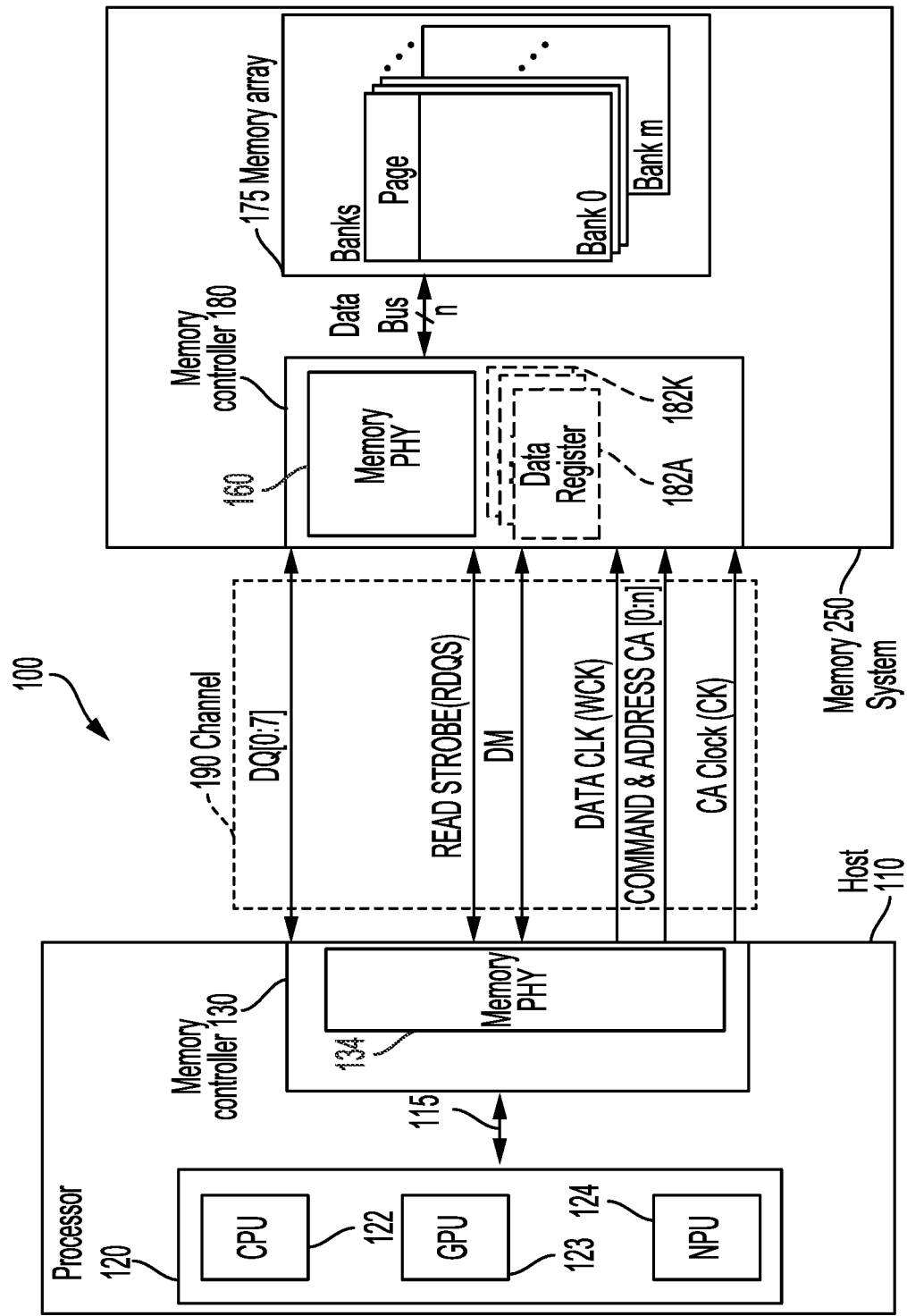
FIG. 2 shows a block diagram of an example computing system incorporating a host, memory system, and channels coupling the host and the memory system with another implementation of the channels according to one or more aspects of the disclosure.

Additional details of an aspect of the embodiment of the apparatus 100 for providing access to a memory system (such as one of memories 150-1-150-4 including logic and control circuit) are shown in FIG. 2. FIG. 2 illustrates a configuration of the host 110, a memory system 250, and the channel 190 of FIG. 1. The channel 190 between host 110 and the memory system 250 may include a plurality of connections, some of which carry data (e.g., user data or application data) and some of which carry non-data (e.g., addresses and other signaling information). For example, non-data connections in channel 190 may include a data clock (e.g., WCK) used in providing data to the respective memory system 250 and a read data strobe (e.g., RDQS) used in receiving data from the respective memory system 250, on a per byte basis. The channel 190 may further include a data mask (e.g., DM, sometimes referred to as data mask inversion DMI to indicate multiple functions performed by the signal connection) signaling used to mask certain part of data in a write operation. The channel 190 may further include command and address (e.g., CA [0:n]) and associated CA clock to provide commands (e.g., read or write commands) to the memory system 250.

The host 110 may include at least one processor 120, which may include a CPU 122, a GPU 123, and/or an NPU 124. The host 110 may further include a memory controller 130 having a controller PHY module 134. The memory controller 130 may couple to the at least one processor 120 via a bus system 115 in performing the various computing functions. The term "bus system" may provide that elements coupled to the "bus system" may exchange information therebetween, directly or indirectly. In different embodiments, the "bus system" may encompass multiple physical connections as well as intervening stages such as buffers, latches, registers, etc. A module may be implemented in hardware, software, or a combination of hardware and software.

The memory controller 130 may send and/or receive blocks of data to other modules, such as the at least one processor 120 and/or the memory system 250. The memory system 250 may include a memory controller 180 with a memory I/O module 160 (e.g., a PHY layer) configured to control electrical characteristics (e.g., voltage levels, phase, delays, frequencies, etc.) to provide or to receive signals on connections of the channel 190. For example, memory I/O module 160 may be configured to capture (e.g., to sample) data, commands, and addresses from the host 110 via the channel 190 and to output data to the host 110 via the channel 190. The memory controller 180 may also include data registers 182A-K configured to store data in transit between the host 110 and the memory array 175 and/or to store configuration settings or other data.

The memory system 250 may further include a memory array 175, which may include multiple memory cells (e.g., DRAM memory cells, MRAM memory cells, SRAM memory cells, Flash memory cells) that store values. The host 110 may read data stored in the memory array 175 and write data into the memory array 175, via the channel 190 and the memory I/O module 160. The memory array 175 may be divided into a plurality of banks with each bank organized as a plurality of pages.

Application or user data may be processed by the processor 120 and the memory controller 130 instructed to store and/or retrieve such data from the memory system 250. For example, data may be generated during the execution of an application, such as a spreadsheet program that computes values based on other data. As another example, data may be generated during the execution of an application by receiving user input to, for example, a spreadsheet program. As a further example, data may be generated during the execution of a gaming application, which generates information regarding a representation of a scene rendered by a three-dimensional (3-D) application.

The host 110 is coupled to the memory system 250 via the channel 190, which is illustrated for a byte of data, DQ [0:7]. As illustrated, the channel 190 includes signal connections of the DQs, a read data strobe (RDQS), a data mask (DM), a data clock (WCK), command and address (CA [0:n]), and command and address clock (CK). The host 110 may use the read data strobe RDQS to strobe (e.g., to clock) data in a read operation to receive the data on the DQs. The memory system 250 may use the data mask DM to mask certain parts of the data from being written in a write operation. The memory system 250 may use the data clock WCK to sample data on the DQs for a write operation. The memory system 250 may use the command and address clock CK to clock (e.g., to receive) the CAs. A signal connection for each of the signaling may include a pin at the host 110, a pin at the memory system 250, and a conductive trace or traces electrically connecting the pins. The conductive trace or traces may be part of a single integrated circuit (IC) on a silicon chip containing the processor 120 and the memory system 250, may be part of a package on package (POP) containing the processor 120 and the memory system 250, or may be part of a printed circuit board (PCB) coupled to both the processor 120 and the memory system 250.

The memory system 250 may include a memory I/O module 160 (e.g., a PHY layer) configured to control electrical characteristics (e.g., voltage levels, phase, delays, frequencies, etc.) to provide or to receive signals on the channel 190. For example, memory I/O module 160 may be configured to capture (e.g., to sample) data, commands, and addresses from the host 110 via the channel 190 and to output data to the host 110 via the channel 190. Information transmitted across the channel 190 may be stored in registers in the memory I/O module 160 of the memory system 250 as a temporary or short-term storage location prior to longer-term storage in the memory array 175.

The memory system 250 may further include a memory array 175, which may include multiple memory cells (e.g., SRAM memory cells) that store information. The host 110 may read data stored in the memory array 175 and write data into the memory array 175 via the channel 190. Moreover, the memory array 175 may be configured to store metadata such as ECCs (e.g., system or array ECCs) associated with the stored data operations according to some embodiments of this disclosure for storing and retrieving information from memory array 175 may be performed by controlling signals on individual lines of the channel 190.

SRAM computing devices, such as SOCs including SRAM, may include one or more faulty SRAM bit storage locations, such as one or more faulty bit cells. Such faults may appear during following fabrication of SRAM. As one example, different bit locations of an SRAM may require supply of different minimum voltages (VMINs) for operation. Different VMIN requirements may result from variations in physical parameters of the different bit locations. Bit locations requiring a greater VMIN than is supplied to the SRAM and/or bit locations that are otherwise defective may be referred to as faulty bit locations. In some SRAM devices there may be large spreads of VMINs across the SRAM bit locations, which may increase BERs of the SRAM devices beyond desired limits. Increased BERs may result in process yield fallout during manufacturing, where SRAM memory units that have BERs greater than a threshold level may be discarded as defective, increasing the production cost of SRAM units. In order to reduce BERs and corresponding fallout, SRAM devices may be configured to run SRAM at higher voltage levels, which may increase a power consumption of the devices and reduce a battery lifetime. Such increased power consumption may negatively impact a user experience, particularly in the context of handheld devices.

An error correction code (ECC) engine may be used to correct and/or detect soft errors in SRAM using Hamming codes, but such an engine may not be capable of correcting multi-bit errors within a word stored in the SRAM. Multi-bit correction algorithms may be implemented to correct multi-bit errors, but such algorithms may substantially increase device latency and area overhead. Thus, such correction algorithms may be unsuited for fast computing tag and data macros in SRAM.

The ACR, line bypass, and bit bypass techniques discussed herein may be implemented to facilitate VMIN reduction in SRAM, while minimizing an increase in device latency caused by such reduction. Such techniques may allow for greater tolerance of multi-bit errors in data arrays and tag arrays of SRAM, which may facilitate reduced power consumption, through use of a reduced VMIN enabling reduced leakage and dynamic power consumption, and enhanced production efficiency, through greater tolerance of higher BERs in SRAM production. Furthermore, the techniques described herein may be compatible with ECC engines and multi-bit correction algorithms to facilitate single bit soft error correction, correcting errors that may arise following fabrication. Furthermore, the techniques described herein may be flexibly enabled. Such flexibility may allow ACR, line bypass, and/or bit bypass techniques to be enabled for chips with a BER exceeding a threshold at fabrication time and disabled for chips with a BER lower than the threshold at fabrication time.

Figures 3A, 3B:
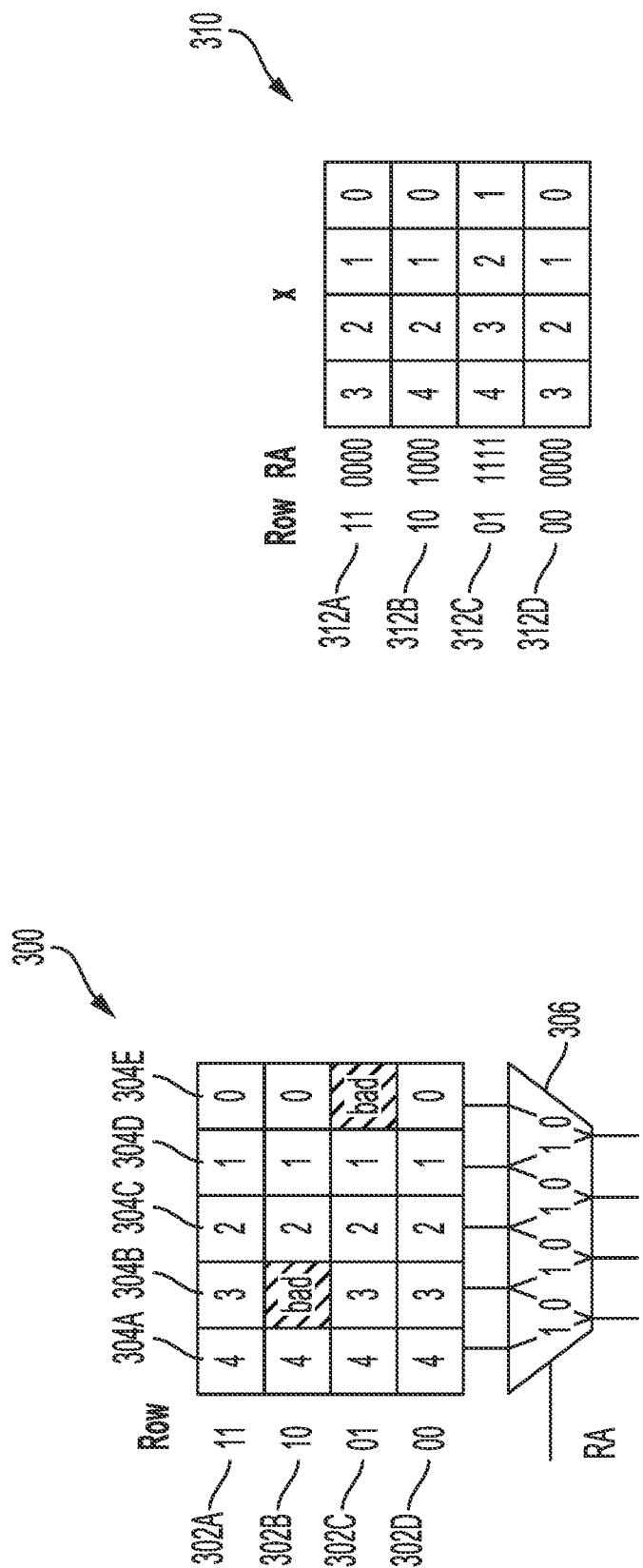
FIG. 3A shows a block diagram of an example data storage of a memory including a spare column and a multiplexer for ACR operation according to one or more aspects of the disclosure.
FIG. 3B shows example output data from a memory according to one or more aspects of the disclosure.

FIG. 3A shows a block diagram of an example data storage 300 of a memory including a spare column and a multiplexer 306 for ACR operation according to one or more aspects of the disclosure. The example data storage 300 may include four rows 302A-D and five columns 304A-E, although a data storage of a memory may include fewer than or greater than the illustrated number of rows and columns. In some aspects, the rows 302A-D may each correspond to a particular set or way of the data storage 300. A spare column 304A may be included in the data storage 300 to facilitate ACR implementation. For example, the spare column 304A may increase the length of each row such that each row has a length of one bit greater than an amount of data to be stored in each row. A two way multiplexer 306 may be included at the bottom of each column to facilitate ACR and may provide enhanced flexibility over other redundancy techniques, such as static column-redundancy techniques where fuses may be configured to correct a single bit in each array. A redundancy address (RA) may be associated with each row of the data storage 300. RAs may be assigned to the rows 302A-D following fabrication, to allow for bypassing of faulty bit locations. When reading data from a row, a redundancy address may be provided to the multiplexer(s) 306 to select a different shift position for each column. Similarly, when writing data to a row, a redundancy address may be provided to the multiplexer(s) 306 to select a different shift position for each column. Thus, for example, when reading data from or writing data to the row 302A, an RA of 0000 may be provided to the multiplexer 306, to read data from or write data to the bit locations of the row 302A at columns 304B-D. Likewise, if a bad bit location is present in a row, such as the bad bit location at column 304B of row 302B, an RA may be 1000 to cause the multiplexer 306 to shift an access position to read from or write to the bit locations at columns 304A, 304C-E, but not column 304B, for row 302B. Thus a set of bits for each row of the data storage 300 may be read from or written to the data storage 300 based on a respective RA for each row, to allow for skipping of bad bits in the data storage 300. In the example output data 310 of FIG. 3B, data 312A read from or written to the first row 302A may correspond to blocks 3, 2, 1, and 0 of the first row 302A, data 312B read from or written to the second row 302B may correspond to blocks 4, 2, 1, and 0 of the second row 302B, data 312C read from or written to the third row 302C may correspond to blocks 4, 3, 2, and 1 of the third row 302C, and data 312D read from or written to the fourth row 302D may correspond to blocks 3, 2, 1, and 0 of the fourth row 302D, based on respective RAs for each row. The RAs associated with each row may be stored in a tag array, as described herein. RAs may, in some aspects, be shared between all rows in a set of the memory 302.

Thus, as shown in FIG. 3A, the multiplexer(s) 306 may facilitate shifting outside of the array of bit locations. The use of RAs may allow for repair of one bit per row, such as one bit per logical address in a set, of the data storage 300, due to the inclusion of the spare column 304A, regardless of physical interleaving. Furthermore, use of the multiplexer(s) 306 for ACR may result in a minimal increase in latency of the data storage 300, as accessing the RAs stored in a tag array may be performed in parallel with tag access, for accessing the respective row, and shifting using the multiplexer(s) 306 based on accessed RAs may add only a single multiplexer delay cycle to a data setup and access time. Thus, ACR techniques may offer similar resiliency to ECC, but at a lower cost. Furthermore, ECC may require codeword granularity to reflect access word size, and avoid read modify and write operations, while the ACR techniques described herein may allow for adjustment of granularity independent of access size. As one particular example, flexible protection granularity may be leveraged to repair one bit for every line of a set of eight lines or for an entire set of eight lines of an L2 cache set of 4096 bits. If a single repair bit is used to protect an entire set of eight lines, only a single seven-bit RA may be used to protect 4096 bits. Thus, for example, a granularity of protection bits can be adjusted based on a number of lines to be protected by a single repair bit. As another example, in L1 caches an ECC may require eight check bits for every stored 64 bit word, while the ACR techniques described herein may use a single seven bit RA for each 2048 bits through use of adjustable granularity of protection. Thus, ACR may provide a large design space of resiliency when compared to area overhead tradeoffs. Furthermore, ACR techniques can be implemented in existing systems with ECC, and ACR can be supplemented by single error correction, double error correction (SECDED) code to protect against intermittent errors. Adding other soft error protection to designs that already use single-bit ECC for voltage reduction by adding double-bit ECC may be cost prohibitive.

Figure 4A:
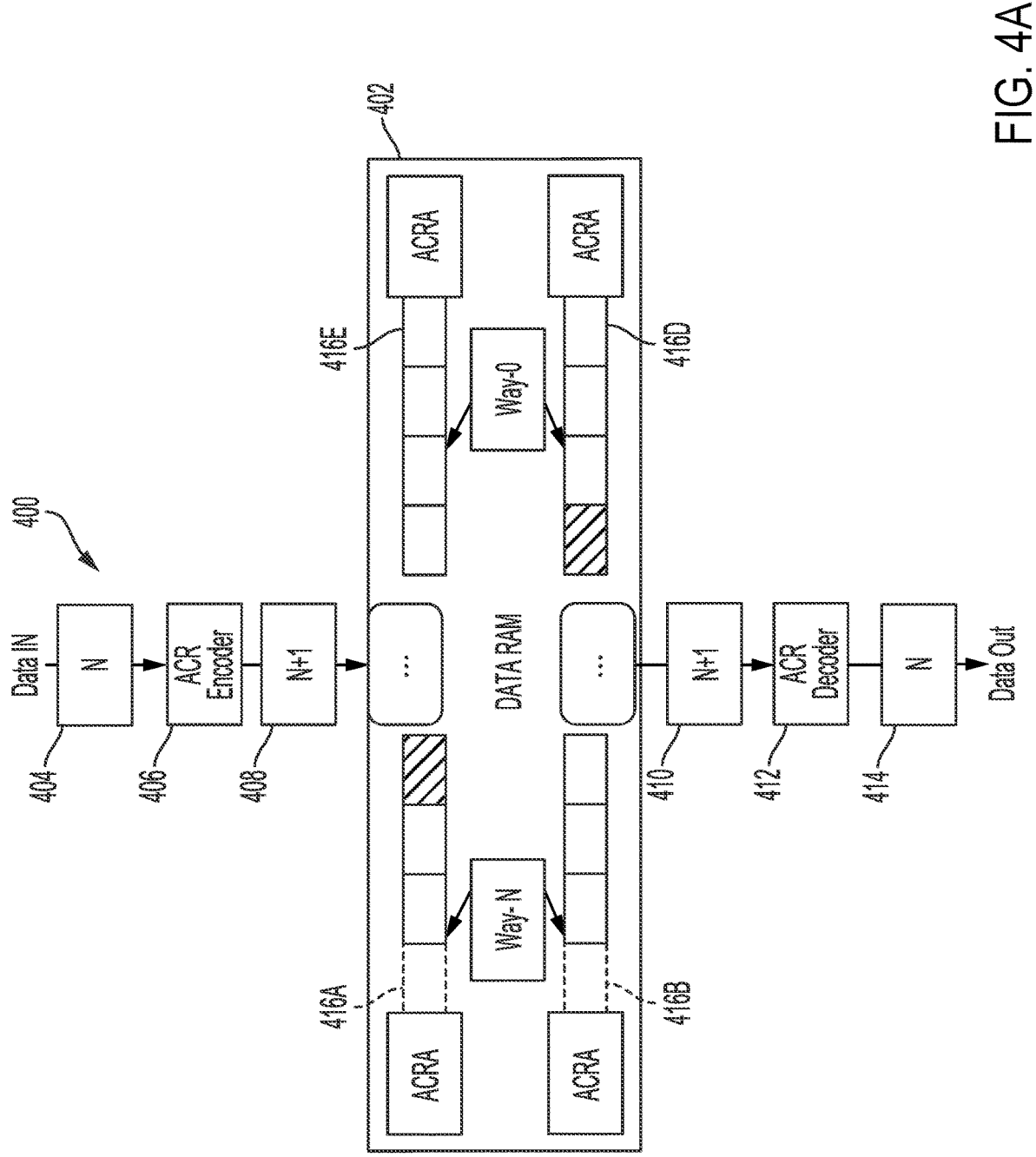
FIG. 4A shows an example block diagram of ACR and line bypass implementation in writing data to and reading data from a data storage portion of an SRAM according to one or more aspects of the disclosure.
Figure 4B:
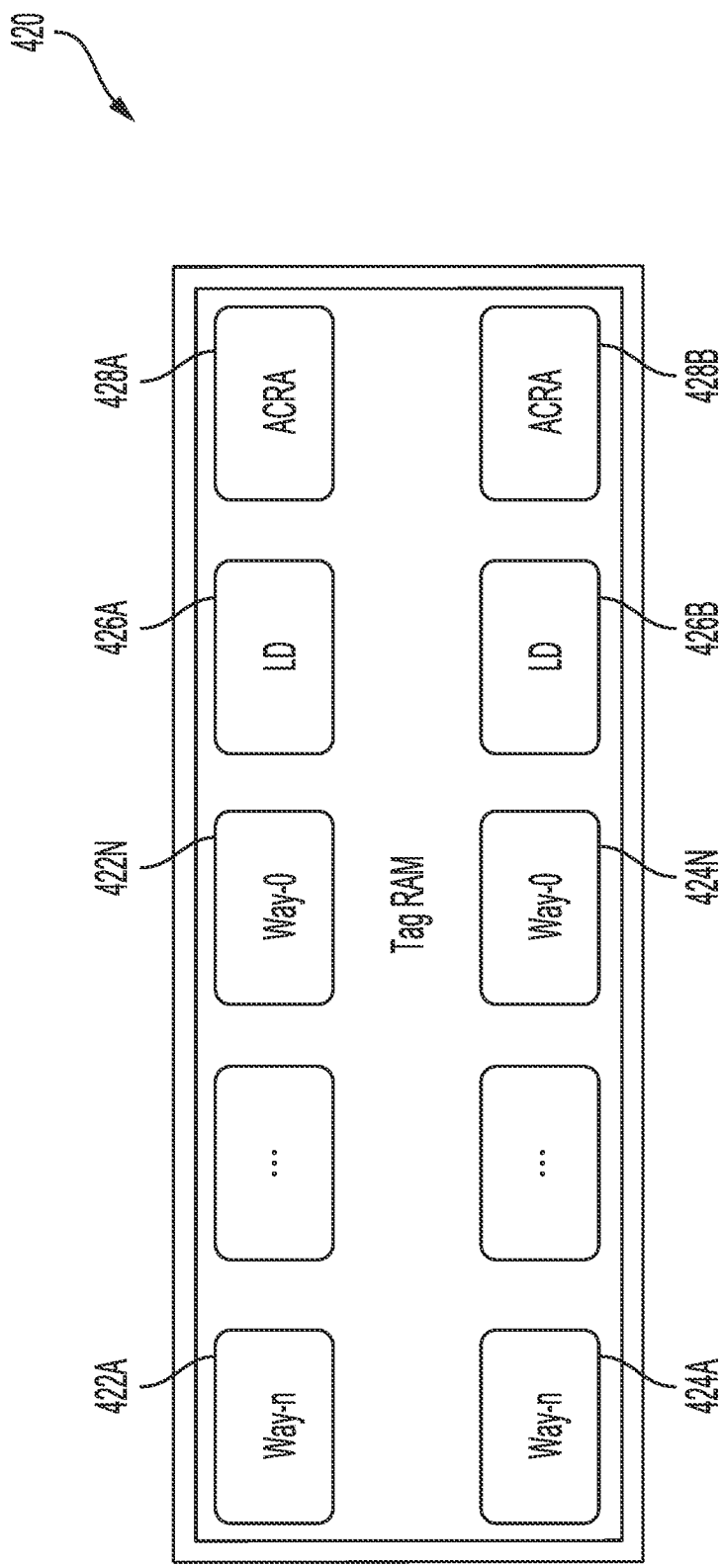
FIG. 4B shows a block diagram of a tag array of an SRAM implementing ACR and line bypass according to one or more aspects of the disclosure.

An example block diagram 400 of ACR and line bypass implementation in writing data to and reading data from a data storage portion 402, such as a data array, of an SRAM is shown in FIG. 4A. Blocks 404-408 may be functional blocks, implemented in hardware or software, of a process for storing data in the hardware data storage portion 402, and blocks 410-414 may be functional blocks, implemented in hardware or software, of a process for reading data from the hardware data storage portion 402. During a write operation, data may be received by a memory controller at block 404 to be written to the data storage portion 402 of the SRAM. At block 406, an ACR encoder, which may be implemented in hardware and/or software, may be implemented by the controller, or otherwise implemented, to determine at which bit locations in the data storage portion 402 of the SRAM the received data should be stored. The ACR encoder may, for example, determine whether one or more rows of the data storage portion 402 are disabled and/or one or more RA addresses for one or more rows of the data storage portion 402 of the SRAM at which data is to be stored. The ACR encoder may, for example, read such information from a tag storage portion of the SRAM, such as a tag array of the SRAM. An example block diagram of a tag storage portion 420 of an SRAM implementing ACR and line bypass is shown in FIG. 4B. The tag storage portion 420 may include a plurality of ways 422A-N associated with a particular row in the data portion 402 of the memory. The row may be associated with a particular line disable bit 426A, such as a line disable tag, and a particular ACRA 428A, such as an ACRA tag. Likewise, the tag storage portion 420 may include additional ACRAs, such as ACRA 428B, and additional line disable bits, such as 426B, for additional rows that may be associated with additional ways 424A-N. As discussed herein the ACRAs may be redundancy addresses that indicate shift information for a row, to be provided to a multiplexer to perform the shift when storing data in or reading data from the row. Every tag of a set, corresponding to a row, may be programmed with a particular ACRA if the tag is associated with the faulty bit location in the set. Thus, for a particular row of the data storage portion 402 of the SRAM at which data is to be stored, such as row 416A, the ACR encoder, at block 406, may read an associated ACRA tag, such as ACRA 428A, to determine an ACRA indicating whether a bit of the row should be bypassed and, if so, which bit location of the row should be bypassed. Likewise, the ACR encoder may determine based on a line disable bit, such as line disable bit 426A or line disable bit 426B, whether a particular row should be disabled, such as in response to multiple faulty bit locations being present in the row. For example, when a line disable bit is set to 1, one or more rows associated with the line disable bit may not be used, which may result in skipping of a row, or set, and allocation of a next row or level of the data storage portion of the SRAM for storage of received data. Thus, when data is input at block 404, the ACR encoder may, at block 406, read an ACRA associated with a row at which the data is to be stored from a tag array, stored either in a tag storage portion of the SRAM or in another memory. In some aspects, address information indicating a row at which data is to be stored may be received by the memory controller, and a tag match may be performed by the ACR encoder, at block 406, to determine a row, ACRA, and/or a line disable variable associated with the address. The ACR encoder may, at block 406, shift the location at which data will be stored according to the RA associated with the row. For example, the ACRA may be provided to one or more multiplexers for storage of the data according to the shifted position indicated by the RA, to avoid storing a bit of the data at a faulty bit location. As one example an RA for a first row 416A of the data storage portion 402 of the SRAM may indicate that data should be stored in the first four bit locations from left to right, due to a fault in the leftmost bit location. As another example, an RA for a second row 416B may indicate that data should be stored in the final four bits from left to right, avoiding using the leftmost spare bit location as there are no faulty bit locations in a row. In some aspects, the first row 416A and the second row 416B may be associated with a same way number. The data storage portion 402 of the SRAM may further include rows, such as rows 416E-D associated with additional way numbers. In some aspects, a cache refill procedure may be used to populate the tag RAM with ACRA information for each row. In some aspects, ACRA lookup may be performed in parallel with a tag matching procedure, and shifting operations may be performed outside of the tag storage portion of the data array.

An example chart 440 of a data array, such as a data storage portion of an SRAM, including multiple faulty bit locations according to one or more aspects of the disclosure is shown in FIG. 4C. For example, the shaded blocks of the chart 440 may indicate faulty bit locations of particular rows. The chart 440 may, for example, indicate faulty bit locations in the data storage portion 402 of the SRAM of FIG. 4A. Row zero may not include any faulty bit locations, row one may include a single faulty bit location at column three, row four may include a single faulty bit location at column zero, and row three may not include any faulty bit locations. Thus, for example, ACRAs stored in a tag storage for rows zero and three may be 0000 to indicate that shifting need not be performed, due to the lack of faulty bits in those rows. An ACRA stored in a tag storage for row one may be 1000 to indicate that the faulty bit location at column three should be bypassed and the spare column should be or is used for storage of a bit, and an ACRA stored in a tag storage for row two may be 1111 to indicate that the faulty bit location at column zero should be bypassed and the spare column should be or is used for storage of a bit. Thus, when data is stored in the SRAM, data may be stored in the bit locations at columns zero, one two, and three for row zero, at columns zero, one, two, and the spare column for row one, at columns one, two, three, and the spare column for row two, and at columns zero, one, two, and three for row four based on ACRAs associated with each respective row.

Figure 4D:
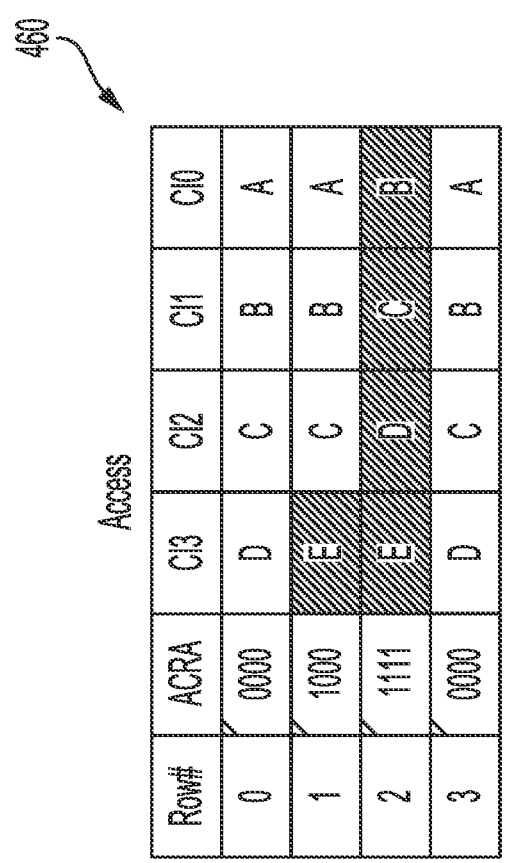
FIG. 4D shows an example chart of a data output from an SRAM implementing ACR according to one or more aspects of the disclosure.

Similarly, a read request to read data stored in the data storage portion 402 of the SRAM of FIG. 4A may be received by a memory controller of the SRAM. At block 412, an ACR decoder, which may be implemented in hardware and/or software, may read an ACRA associated with a row from which data is to be read according to the read request from a tag storage portion of the SRAM, such as from a tag array, and may shift a position of bits to be read, at block 410, according to the ACRA to avoid providing information from the faulty bit locations in output data at block 414. The ACR decoder may provide the output data at block 414, such as to a host device that provided the memory controller of the SRAM with the read request. An example chart 460 of a data output from an SRAM implementing ACR is shown in FIG. 4D. The output data of the chart 460 may correspond to the non-faulty bit positions shown in the chart 440 of FIG. 4C. For example, output data for rows zero and three may include bits stored at columns zero, one, two and three, output data for row one may include bits stored at columns zero, one, two, and the spare column, and output data for row two may include bits stored at columns one, two, three, and the spare column. Thus, in the output data the faulty bit locations at column three of row one and column zero of row two, indicated in the chart 440 of FIG. 4C may be bypassed according to ACRAs associated with each row of the memory.

Figure 5:
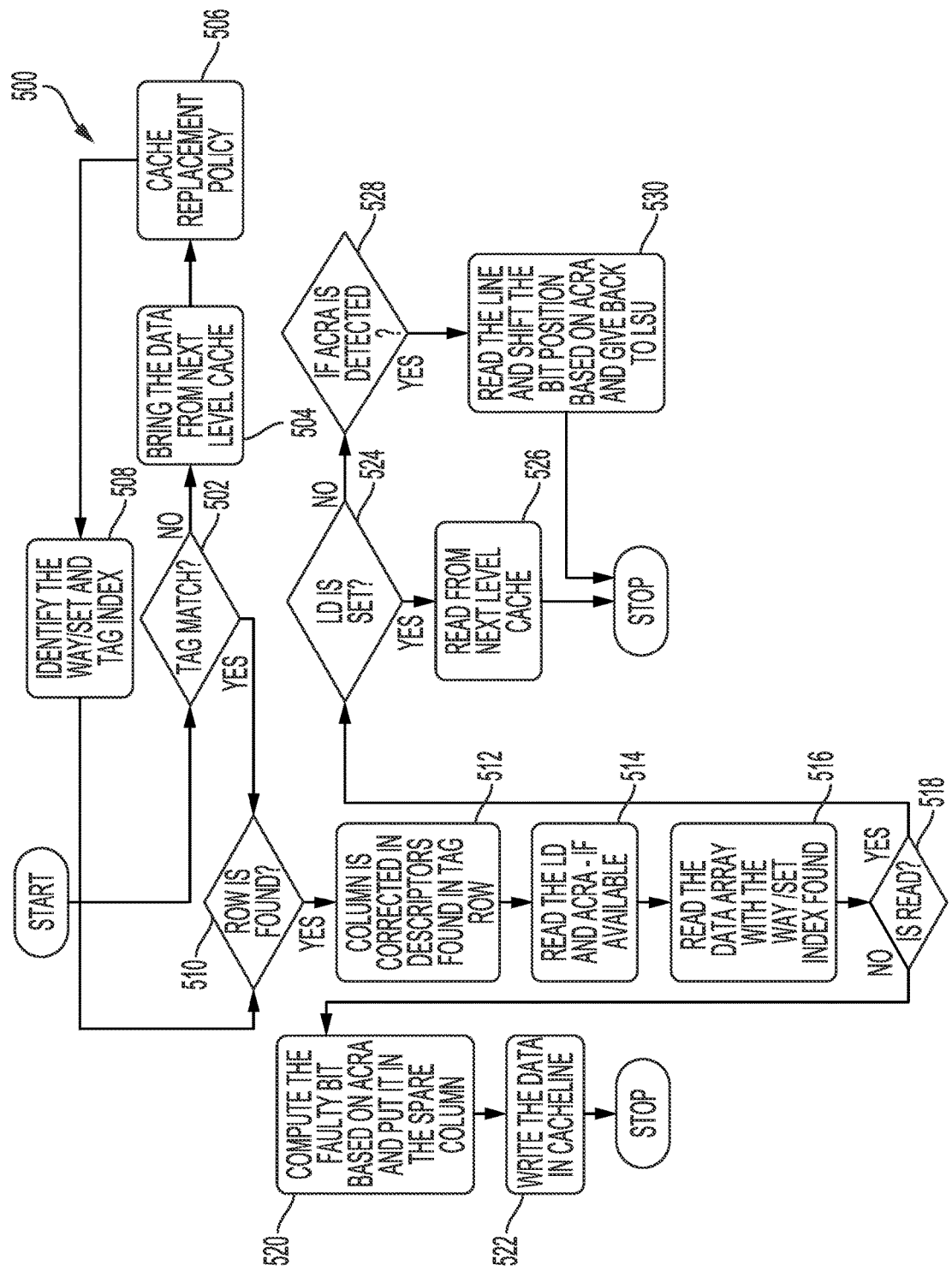
FIG. 5 is a flow chart illustrating an example process for implementation of ACR and line bypass techniques according to one or more aspects of the disclosure.

An example flow chart illustrating an example process 500 for implementation of ACR and line bypass techniques is shown in FIG. 5. The method 500 may, for example, be performed by a memory controller of a memory module including an SRAM memory. The process 500 may begin at block 502 with a tag matching procedure. For example, a memory controller may determine whether address information for an address in a data portion of the SRAM received in a read or write request matches a tag in a tag array, such as a tag portion of the SRAM memory. If the tag match procedure is a failure, data may be brought from a next level cache of the data portion of the SRAM. At block 506, a cache replacement policy may be executed, and at block 508, a way, set, and tag index for the location, such as for a row in the data storage indicated by the address, in the data storage may be identified. After the way, set, and/or tag index associated with the row are identified at block 508, the process 500 may proceed to a determination, at block 510, that the row is found. Similarly, the process may proceed to the determination, at block 510, that the row is found if the tag match at block 502 is successful. The determination, at block 510, that the row is found, may include a determination that information associated with a row of the data storage portion of the SRAM from which data is to be read or to which data is to be written is found at a row in the tag array. The determination that the row is found may, for example, include a determination that the row is found in a redundant data structure (RDS) of the tag array.

Following the determination, at block 510, that the row is found, determination may be performed that a column is corrected in descriptors found in a the row of the tag array associated with the row in the data storage portion of the memory at which data is to be stored or from which data is to be read. At block 514, a line disable variable and/or an ACRA associated with the row of the data storage portion of the memory may be read from the tag array, if the line disable variable and/or the ACRA are present in the tag array. At block 516, a read may be performed on the data array, such as the data storage portion of the SRAM, using a way and/or set index located in the tag array associated with a row from which data is to be read or to which data is to be written. For example, the read at block 516 may include locating the row indicated by the way and/or set index read from the tag array. At block 518, a determination may be made of whether a request being executed is a read request or a write request. If the request is not a read request, the request may be a write request, and a faulty bit position may be computed, at block 520, based on an ACRA associated with the row to which data is to be written. For example, data may be stored in a bit location of a spare column of the row instead of in the faulty bit location, as indicated by the ACRA of the row. At block 522, the data may be written in the row of the data storage portion of the SRAM, such as in the cache line, and the write request may be concluded.

If the request is determined, at block 518, to be a read request, a determination may be made, at block 524, of whether a line disable bit associated with the row is set, to prevent data from being stored in the row, such as due to multiple faulty bit locations being present in the row. If the line disable bit is determined to be set at block 524, data may be read from a next level, such as from a next row, in the data storage portion of the SRAM, at block 526. If the line disable bit is determined not to be set, at block 524, a determination may be made, at block 528, of whether an ACRA associated with the row was detected in the tag array. If a determination is made, at block 528, that an ACRA associated with the row was detected in the tag array, a shift may be performed according to the ACRA in reading the data from the row, at block 530. For example, a bit position of the row may be shifted when reading the data from the row according to the ACRA to refrain from reading the faulty bit location, and the data may be returned to a load store unit.

Faulty bit locations, such as faulty bit cells, may also be present in a tag array, such as a tag storage portion of an SRAM. A bit bypass technique may be used to bypass the faulty tag array bit locations through storage of redundant repair bits in a repair bit array of the SRAM. For example, a redundant set of flip flops may be used to repair a single faulty bit cell in the tag array through storage of a replacement redundant bit associated with a row and column address of the faulty bit cell. A targeted allowable BER of a macro for the SRAM tag array may determine a total number of redundant sets provided in a repair array, and a bit bypass technique may be added to protect any standalone SRAM macro in a digital design. The bit bypass technique as described herein may add a timing overhead of two multiplexers to a read delay from the tag array. Furthermore, use of the bit bypass technique described herein may require a substantial write address setup time, but such latency overhead may not be on a critical path and may have a minimal impact on a user experience.

A minimum operating voltage of an SRAM device may be limited by a few multi-bit faults, instead of a substantial number of single-bit faults. The bit bypass techniques described herein may repair multi-bit faults in tag arrays of an SRAM, while ACR techniques may be used to repair single-bit faults in a data storage portion of the SRAM. At a supply voltage of the SRAM, where a first double-bit failure may appear in a cache set, ACR may correct fewer than one percent of all sets in the SRAM. Line disable may further prevent accesses to lines of the data storage portion of the SRAM having multi-bit failures, which may allow for enhanced utilization of ACR. Use of bit bypass techniques with respect to a tag array of the SRAM may further enhance efficiency, by allowing replacement of disabled bits with each tag and use of a way replacement algorithm to avoid refills to disabled arrays. Bit bypass overhead may also be reduced through use of line disable bits to disable ways of the tag array with a number faulty tag bit locations exceeding a threshold number.

Figure 6:
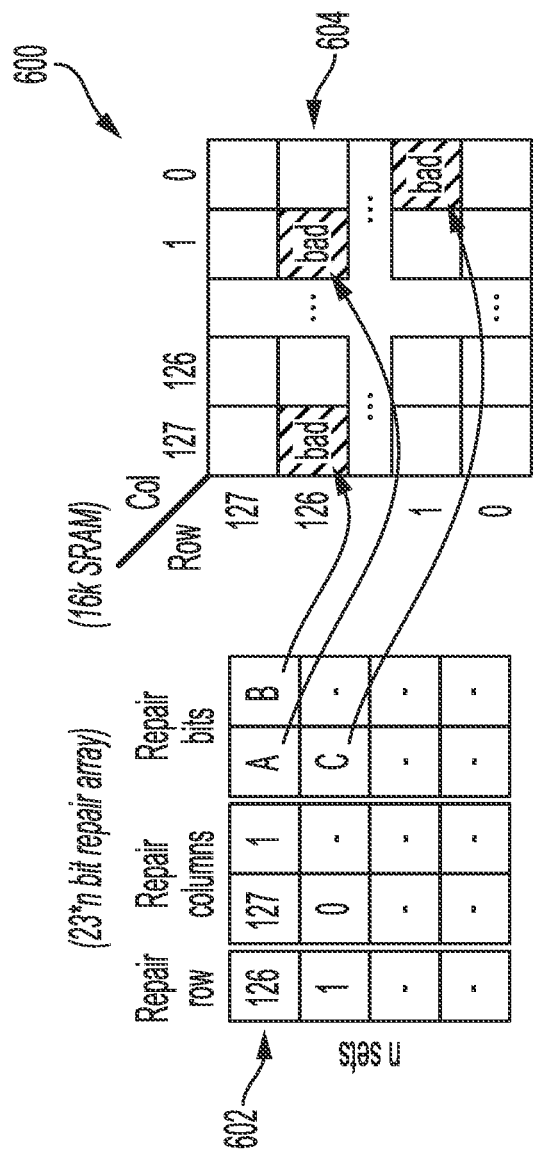
FIG. 6 is a block diagram of an example tag array of an SRAM and an associated repair array according to one or more aspects of the disclosure.

FIG. 6 is a block diagram 600 of an example tag array 604 and an associated repair array 602 according to one or more aspects of the disclosure. The tag array 604 may include multiple shaded bad bit locations in a single row, and corresponding repair bits may be included in the repair array 602, as indicated by the arrows, for the shaded faulty tag bit locations. Each repair bit may be stored in the repair array 602 with an indication of the bit location of the tag array 604, such as the row and column of the bit location, with which the repair bit is associated. For example, rows including multiple faulty bit locations may be handled through storage of column and row addresses, which may be determined at a post-silicon fabrication time for each part, at the repair array 602. As one example, row 127 of the example tag array 604 may not include faulty bits, and thus no repair bits may be allocated for row 127 in the repair array 602. As another example, row 126 of the example tag array 604 may include a faulty bit location at column 127 and a faulty bit location at column 1. Thus, an indicator of the row of the tag array 604 to be repaired, row 126, and indicators of columns of the row at which faulty bit locations are located, columns 127 and 1, may be stored in a first row of the repair array 602, along with corresponding repair bits, repair bits A and B. Thus, multiple repair bits may repair multiple respective bits of a single row of the tag array through use of a bit bypass technique.

Figure 7A:
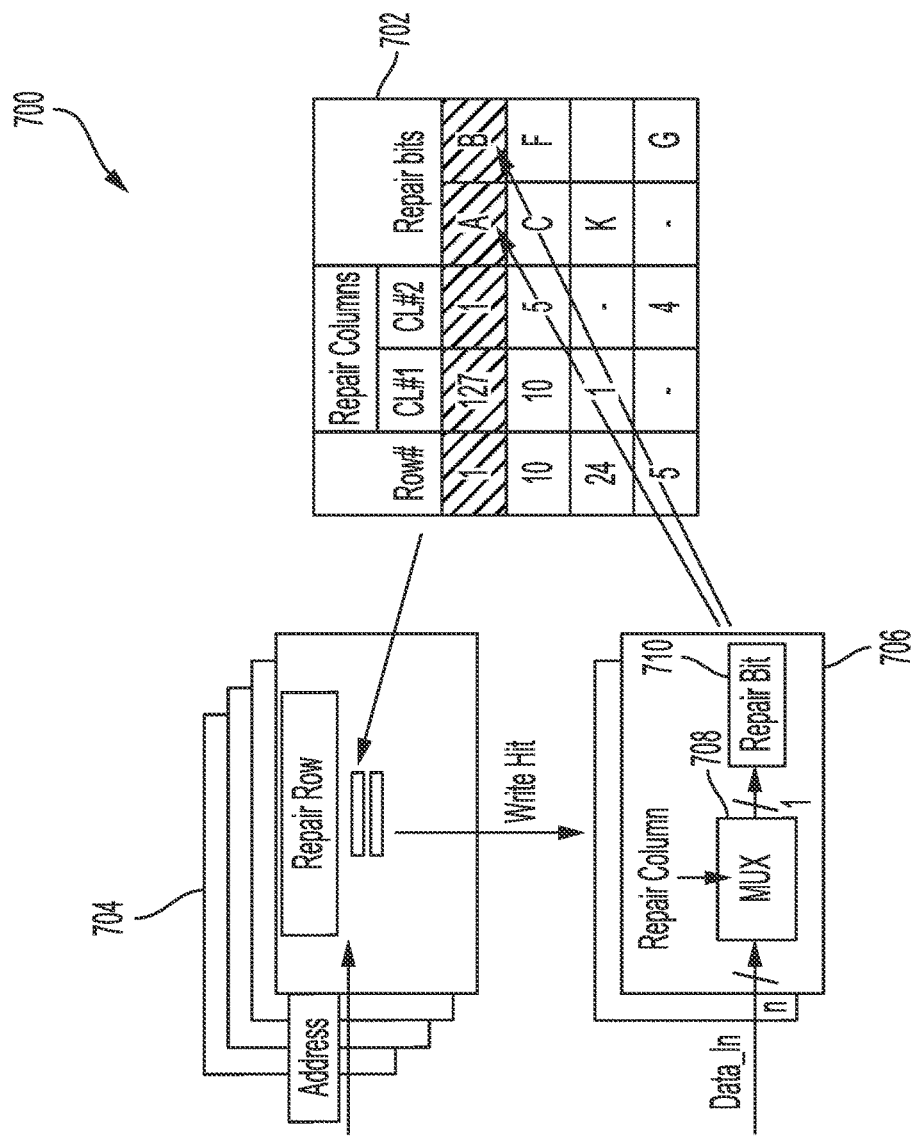
FIG. 7A is a block diagram of example implementation of bit bypass when writing data to a tag array according to one or more aspects of the disclosure.

FIG. 7A is a block diagram 700 of example implementation of bit bypass when writing data to a tag array according to one or more aspects of the disclosure. At block 704, an address of a location in a tag array at which data is to be stored may be input to a repair row block 704 for determination of a repair row associated with the row of the tag array at which the data is to be stored. An indication of columns of the row of the tag array associated with faulty bit locations may be provided to a write function along with corresponding locations in a repair bit array at which redundant bits should be stored for writing of the data, at block 706. A multiplexer 708 may determine which bits are to be stored at the repair bit locations based on information from the repair row block 704, and the bits corresponding to the faulty bit locations of the row may, at block 710, be stored at the repair bit locations indicated by the repair bit chart 702.

Figure 7B:
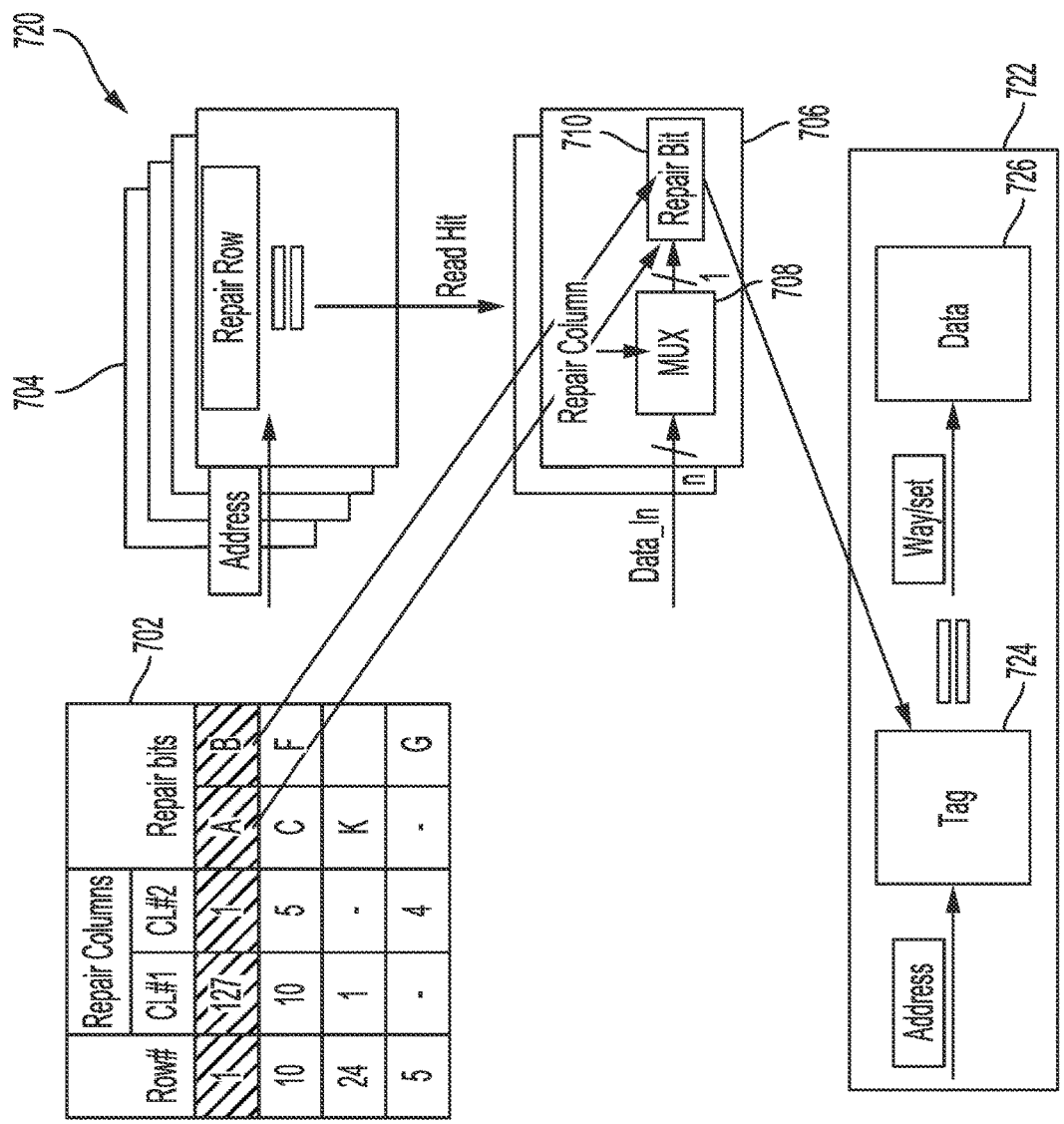
FIG. 7B is a block diagram of example implementation of bit bypass when reading data from a tag array according to one or more aspects of the disclosure.

FIG. 7B is a block diagram 720 of example implementation of bit bypass when reading data from a tag array according to one or more aspects of the disclosure. When a read operation is performed on the tag array, an address to be read from may be provided to a repair row block 704. The repair row block 704 may determine one or more columns of the row of the tag array to be read from that correspond to faulty bit locations. The repair block 704 may provide the rows and columns of the repair array to be read from in place of the faulty bit locations of the row of the tag array at block 706, such as through providing an indication of the repair columns and rows to the multiplexer 708 for loading of the repair bits from the locations indicated by chart 702. As one example, such operation may be performed when reading data from or writing data to a data storage portion of the SRAM that also includes the tag array. For example, in read/write block 722, an address may be received for reading data from the tag array 724, and the bit bypass technique may include reading data from the good bit locations of the row of the tag array 724 and the repair bit locations corresponding to the bad bit locations of the row of the tag array 724 corresponding to the received address. The data read from the tag array, such as ACRA and/or line bypass data, may be used in application of ACR techniques in writing data to or reading data from the data storage portion 726 of the SRAM as described herein.

Figure 8:
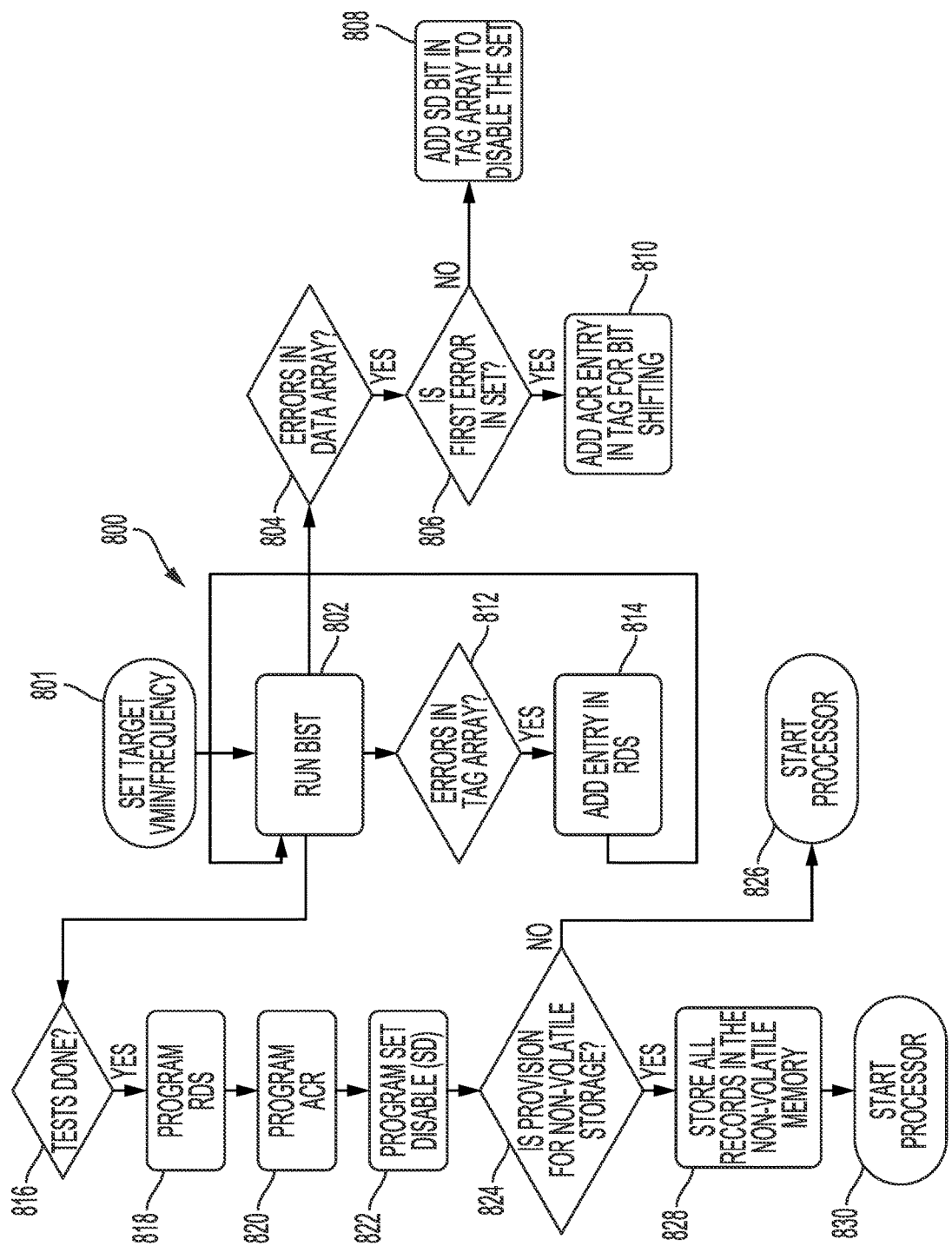
FIG. 8 is a flow chart illustrating an example process for generation of ACRA, bit bypass, and line disable data stored in a tag array of an SRAM according to one or more aspects of the disclosure.

FIG. 8 is a flow chart illustrating an example process 800 for generation of ACRA, bit bypass, and line disable data stored in an tag array of an SRAM according to one or more aspects of the disclosure. At block 801, a target minimum voltage and/or frequency level for the SRAM may be set. The target minimum voltage and/or frequency may be set for any voltage/frequency or for multiple voltage/frequency corners associated with the SRAM. At block 802, a built-in self-test (BIST) may be performed on the SRAM. During the BIST, one or more errors, such as one or more faulty bit locations, may be detected in a tag array and/or a data array of the SRAM. If one or more errors are detected in the data array at block 804, a determination may be made at block 806 of whether a detected error is a first detected error in a set of the data array of the SRAM, such as a first detected error in a row of the SRAM. If the error is not a first detected error in a set of the SRAM, such as if the row of the data array includes multiple faulty bit locations, a set disable bit, such as a line or row disable bit, may be toggled at block 808 for the set in the tag array to indicate that the set, such as the row, including multiple errors is disabled. If the error is the first error in the set, an ACRA entry may be added to the tag array associated with the set of the data array, at block 810, to indicate that shifting should be performed to avoid storing data at and/or reading data from the faulty bit location of the set. Similarly, at block 812, one or more errors may be detected in the tag array. At block 814, an entry may be added to a redundant data structure of the tag array, such as through allocation of one or more redundant bits in a repair array of the SRAM along with indications of the bit locations of the tag array associated with the redundant bits. The BIST may then continue at block 802. When the BIST is completed at block 816, a redundant data structure of the tag array may be programmed at block 818. For example, a repair bit array for the tag array may be programmed based on entries added at block 814. At block 820, one or more ACRAs of the tag array may be programmed, such as based on operations performed at block 810. At block 822, one or more set disable bits may be programmed, such as based on operations performed at block 808. At block 824, a determination may be made of whether provision for non-volatile storage is made. If not, initialization of a processor associated with the SRAM may continue at 826. If provision is made for non-volatile storage, all records may be stored in the non-volatile memory at block 828, and the processor may be started at block 830.

Figure 9:
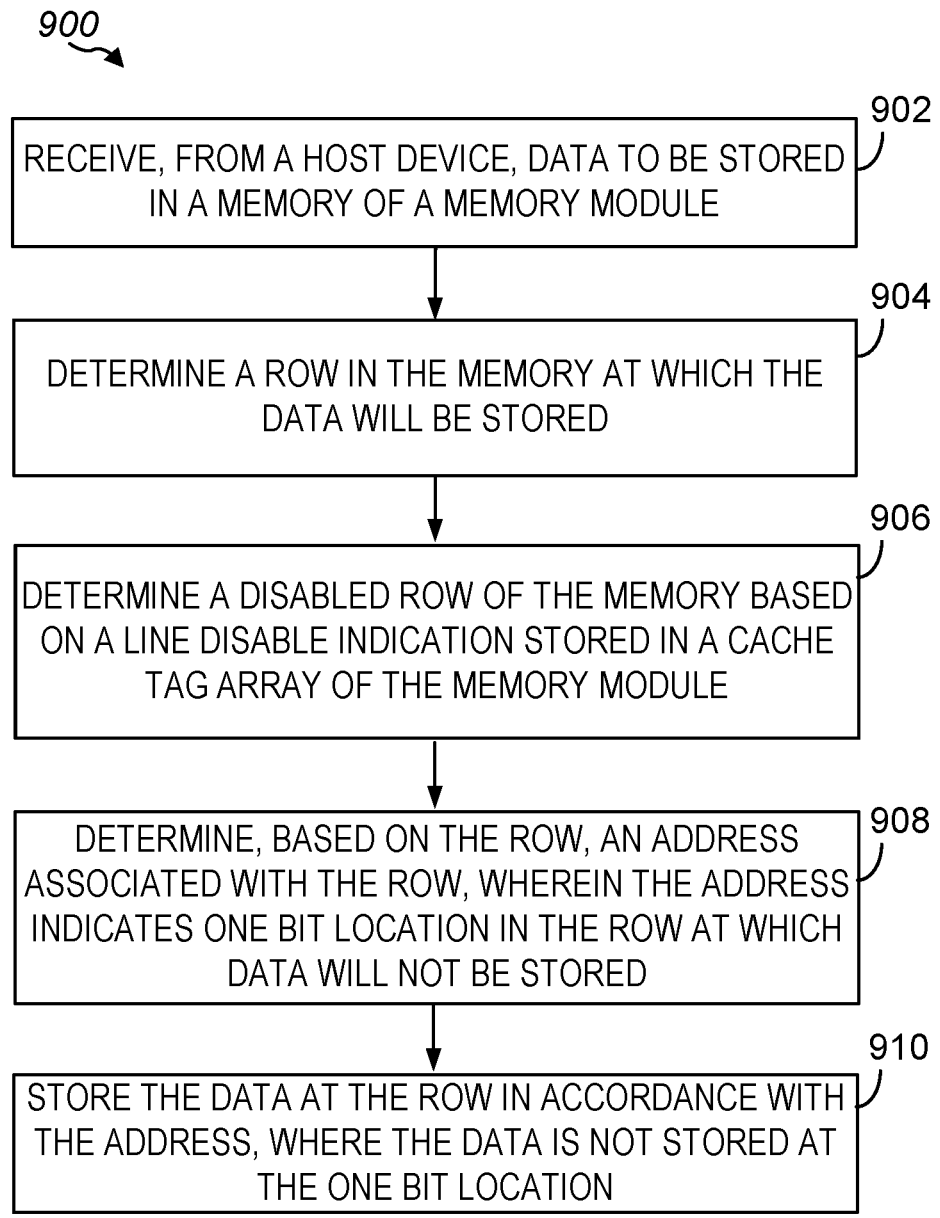
FIG. 9 is a flow chart illustrating an example process for writing data to a memory with SRAM fault correction according to one or more aspects of the disclosure.

FIG. 9 is a flow chart illustrating an example process 900 for writing data to a memory with SRAM fault correction according to one or more aspects of the disclosure. Such a process may, for example, be performed by a memory controller of a memory system including an SRAM memory based on a write command received from a host device, such as host 110 of FIG. 2. The process 900 may begin at block 902 with receipt of data to be stored in a memory of a memory module from a host device. Such data may, for example, be received in a write command from a host device. The memory may, for example, be an SRAM.

At block 904, a determination may be made of a row in the memory at which the data will be stored. For example, the host device may provide a storage indication indicating where the data will be stored in the memory module and the memory controller may determine a row at which the data will be stored based on the received storage indication. As one particular example, an address may be received from the host device, and the memory controller may determine a way and/or set at which the data will be stored based on the address and a tag array of the memory module. Thus, a row for storage of the data may correspond to a particular way of a particular set or to a particular set including one or more ways. As another example, the memory controller may determine a row at which the data will be stored based on a timing of receipt of the data or based on another factor.

At block 906, the memory controller may determine a disabled row of the memory based on a line disable indication stored in a cache tag array of the memory module. For example, in some aspects, the memory controller may determine that a row of the memory, such as a row associated with one or more ways or sets or a data storage array of the memory, is disabled based on a line disable bit stored in a tag array of the memory module and may refrain from storing the data in the disabled row based on determination that the row is disabled. The tag array of the memory module may, for example, be a tag array of the same SRAM that includes the data array. A line disable bit may be set for a row, for example, when more than one faulty bit location, such as more than one faulty bit cell, is detected in the row. Thus, in determining a row in the memory at which the data will be stored, the memory controller may, in some aspects, determine that the data will not be stored at the disabled row of the memory based on the line disable indication associated with the row.

At block 908, the memory controller may determine, based on the determined row, an address associated with the row. The address may indicate one bit location, such as one bit cell, of the row at which data will not be stored. For example, the address may indicate a faulty bit location of the row that should be bypassed for use of a spare bit location of the row. The address may, for example, be an RA for the row, which may also be referred to as an ACRA for the row. The ACRA may be stored in the tag array, such as a tag array of the SRAM, and associated with the row, along with one or more ways associated with the row, a line disable bit associated with the row, and/or other parameters associated with the row. Thus, determination of the address associated with the row may include reading the address associated with the row from the tag array, such as from the cache tag array. The address may, for example, indicate a faulty bit of the row that should be bypassed. For example, the address may be an address that, when provided to one or more multiplexers, causes the one or more multiplexers to bypass the faulty bit of the row in storing data in and/or reading data from the row. In some aspects, the memory may include a single spare column, and the address may indicate whether a bit location of the spare column associated with the row should be written to or read from in place of a faulty bit location of the row. In some aspects a same RA may be associated with multiple different rows of the SRAM having faulty bit locations in a same column.

In some aspects, a bit bypass technique, as described herein, may be performed in determining the address associated with the row, such as in reading the address associated with the row. For example, one or more faulty bit locations may be located in the tag array, and repair bits associated with the faulty bit locations of the tag array may be stored in a repair array of the memory. Thus, in reading the address from the tag array, a determination may be made that a first bit location in a row of the tag array at which the RA is stored is faulty, a determination may be made that a second bit location at which a repair bit of the address corresponding to the first bit location is stored, and the repair bit may be read from the second bit location in place of the faulty bit location of the row of the tag array. Thus, a faulty bit location of a tag array may be bypassed and a repair bit may be read in place of reading from the faulty bit location.

At block 910, the memory controller may store the data at the row in accordance with the address. In doing so, the data may not be stored at the one bit location, such as at the faulty bit location, indicated by the address. For example, the memory controller may adjust a shift position of a multiplexer for storing the data in the row in accordance with the address to bypass the one bit location based on the determined address.

Figure 10:
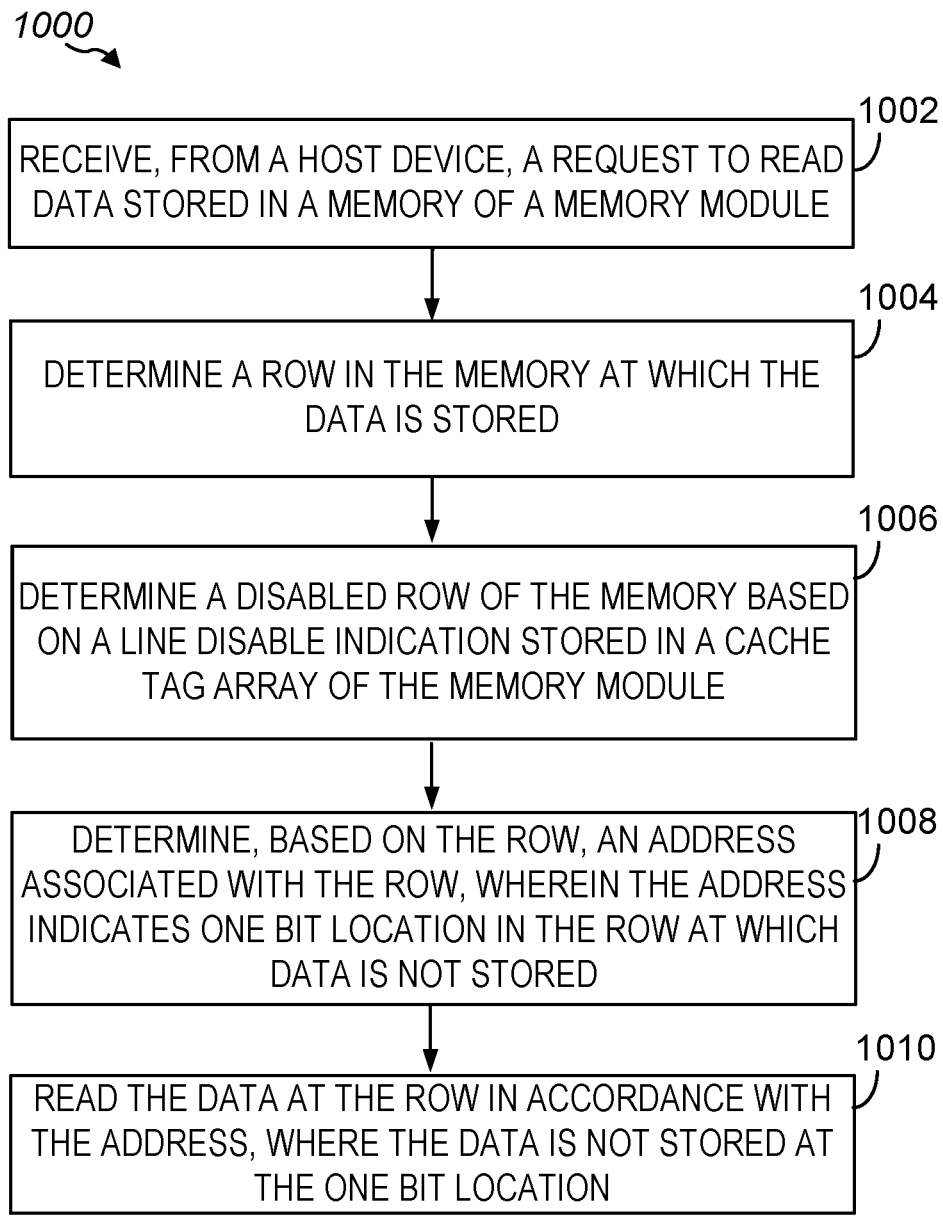
FIG. 10 is a flow chart illustrating an example process for reading data from a memory with SRAM fault correction according to one or more aspects of the disclosure.

FIG. 10 is a flow chart illustrating an example process 1000 for reading data from a memory with SRAM fault correction according to one or more aspects of the disclosure. Such a process may, for example, be performed by a memory controller of a memory system including an SRAM memory based on a write command received from a host device, such as host 110 of FIG. 2. The process 1000 may begin at block 1002 with receipt of a request to read data stored in a memory of a memory module from a host device. The request, for example, be a read command from a host device. The memory may, for example, be an SRAM.

At block 1004, a determination may be made of a row in the memory at which the data is stored. For example, the host device may provide a storage indication indicating where the data is stored in the memory module and the memory controller may determine a row at which the data is stored based on the received storage indication. As one particular example, an address may be received from the host device, and the memory controller may determine row at which the data is stored based on the address and a tag array of the memory module.

At block 1006, the memory controller may determine a disabled row of the memory based on a line disable indication stored in a cache tag array of the memory module. The cache tag array may, for example, be stored in the memory from which the data is to be read. For example, the cache tag array and the data to be read may both be stored in an SRAM of the memory module. In some aspects, the memory controller may determine that a row of the memory, which may be associated with one or more ways or one or more sets of the memory, such as a row of a data storage array of the memory is disabled based on a line disable bit stored in a tag array of the memory module and may refrain from reading the data in the disabled row, or attempting to read data from the disabled row, based on determination that the row is disabled. A line disable bit may be set for a row, for example, when more than one faulty bit location, such as more than one faulty bit cell, is detected in the row. Thus, in determining a row in the memory at which the data is stored, the memory controller may, in some aspects, determine that the data is not stored at the disabled row of the memory based on the line disable indication associated with the row.

At block 1008, the memory controller may determine, based on the determined row, an address associated with the row. The address may indicate one bit location, such as one bit cell, of the row at which data is not stored. For example, the address may indicate a faulty bit location of the row that should be bypassed for use of a spare bit location of the row. The address may, for example, be an RA for the row, which may also be referred to as an ACRA for the row. The ACRA may be stored in the tag array, such as a tag array of the SRAM, and associated with the row, along with one or more ways associated with the row, a line disable bit associated with the row, and/or other parameters associated with the row. Thus, determination of the address associated with the row may include reading the address associated with the row from the tag array. The address may, for example, indicate a faulty bit location of the row that should be bypassed. For example, the address may be an address that, when provided to one or more multiplexers, causes the one or more multiplexers to bypass the faulty bit location of the row in storing data in and/or reading data from the row. In some aspects, the memory may include a single spare column, and the address may indicate whether a bit location of the spare column associated with the row should be written to or read from in place of a faulty bit location of the row. In some aspects a same RA may be associated with multiple different rows of the SRAM having faulty bit locations in a same column.

In some aspects, a bit bypass technique, as described herein, may be performed in determining the address associated with the row, such as in reading the address associated with the row. For example, one or more faulty bit locations may be located in the tag array, and repair bits associated with the faulty bit locations of the tag array may be stored in a repair array of the memory. Thus, in reading the address from the tag array, a determination may be made that a first bit location in a row of the tag array at which the RA is stored is faulty, a determination may be made that a second bit location at which a repair bit of the address corresponding to the first bit location is stored, and the repair bit may be read from the second bit location in place of the first bit location. Thus, a faulty bit location of a tag array may be bypassed and a repair bit may be read in place of reading from the faulty bit location.

At block 910, the memory controller may read the data from the row in accordance with the address. In doing so, the data may not be read from the one bit location, such as at the faulty bit location, indicated by the address. For example, the memory controller may adjust a shift position of a multiplexer for reading the data from the row in accordance with the address to bypass the one bit location based on the determined address.

A wireless communications device may include a memory system as illustrated in at least FIG. 1 and FIG. 2 and configured to receive and output data from the memory array and perform SRAM fault correction on the memory array. The memory system according to any of the aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, or avionics systems.

In one or more aspects, techniques for memory storage and retrieval may include additional aspects, such as any single aspect or any combination of aspects described below or in connection with one or more other processes or devices described elsewhere herein. In a first aspect, supporting data operations may include an apparatus configured to perform operations including receiving, by a memory controller coupled to a memory module through a first channel and configured to store data in and access data stored in the memory module through the first channel from a host device, data to be stored in a memory of the memory module, determining, by the memory controller, a row in the memory at which the data will be stored, determining, by the memory controller based on the row, an address associated with the row, wherein the address indicates one bit location in the row at which data will not be stored, and storing, by the memory controller, the data at the row in accordance with the address, wherein the data is not stored at the one bit location. In some aspects, the apparatus may include a processor, such as a memory controller coupled to a memory module through a first channel and configured to store data in and access data stored in the memory module through the first channel and configured to perform the operations described herein.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the address comprises a redundancy address (RA).

In a third aspect, in combination with one or more of the first aspect or the second aspect, to determine the address, the apparatus is further configured to perform operations comprising: determining the row in the memory at which data will be stored and reading the address associated with the row in the memory at which data will be stored from a cache tag array of the memory module.

In a fourth aspect, in combination with one or more of the first aspect through the third aspect, to read the address associated with the row in the memory at which data will be stored from a cache tag array of the memory module, the apparatus is further configured to perform operations comprising: determining a first bit location in a row of the tag array at which the address is stored is faulty, determining a second bit location at which a repair bit of the address corresponding to the first bit location is stored, and reading the repair bit from the second bit location.

In a fifth aspect, in combination with one or more of the first aspect through the fourth aspect, the memory of the memory module comprises a single spare column.

In a sixth aspect, in combination with one or more of the first aspect through the fifth aspect, the apparatus is further configured to perform operations comprising determining a disabled row of the memory based on a line disable indication stored in a cache tag array of the memory module, wherein to determine the row in the memory at which the data will be stored, the memory controller is further configured to perform operations comprising determining not to store the data at the disabled row based on the determination of the disabled row.

In a seventh aspect, in combination with one or more of the first aspect through the sixth aspect, to store the data at the row in accordance with the address, the apparatus is further configured to perform operations comprising adjusting a shift position of a multiplexer for storing the data at the row to bypass the one bit location based on the determined address.

In an eighth aspect, in combination with one or more of the first aspect through the seventh aspect, the memory comprises a static random access memory (SRAM).

In a ninth aspect, in combination with one or more of the first aspect through the eighth aspect, the address is further associated with one or more additional rows having a corresponding bit location at which data will not be stored.

In a tenth aspect, in combination with one or more of the first aspect through the ninth aspect, the one bit location is a faulty bit location.

In an eleventh aspect, supporting data operations may include an apparatus configured to perform operations including receiving, by a memory controller coupled to a memory module through a first channel and configured to store data in and access data stored in the memory module through the first channel from a host device, a request to read data stored in a memory of the memory module, determining, by the memory controller a row in the memory at which the data is stored, determining, by the memory controller based on the row, an address associated with the row, wherein the address indicates one bit location in the row at which the data is not stored, and reading, by the memory controller, the data at the row in accordance with the address, wherein the data is not stored at the one bit location.

In a twelfth aspect, in combination with the eleventh aspect, the address comprises a redundancy address (RA).

In a thirteenth aspect, in combination with one or more of the eleventh aspect through the twelfth aspect, to determine the address, the apparatus is further configured to perform operations comprising: determining the row in the memory at which data is stored and reading the address associated with the row in the memory at which data is stored from a cache tag array of the memory module.

In a fourteenth aspect, in combination with one or more of the eleventh aspect through the thirteenth aspect, to read the address associated with the row in the memory at which data is stored from a cache tag array of the memory module, the apparatus is further configured to perform operations comprising: determining a first bit location in a row of the tag array at which the address is stored is faulty, determining a second bit location at which a repair bit of the address corresponding to the first bit location is stored, and reading the repair bit from the second bit location.

In a fifteenth aspect, in combination with one or more of the eleventh aspect through the fourteenth aspect, the apparatus is further configured to perform operations comprising: determining a disabled row of the memory based on a line disable indication stored in a cache tag array of the memory module, wherein to determine the row in the memory at which the data is stored, the memory controller is further configured to perform operations comprising determining not to read the data at the disabled row based on the determination of the disabled row.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-2 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to the figures included with this description may be combined with one or more blocks (or operations) described with reference to another of the figures. For example, one or more blocks (or operations) of FIG. 3 may be combined with one or more blocks (or operations) of FIG. 1 or FIG. 2.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

As used herein, the term "coupled to" in the various tenses of the verb "couple" may mean that element A is directly connected to element B or that other elements may be connected between elements A and B (i.e., that element A is indirectly connected with element B), to operate certain intended functions. In the case of electrical components, the term "coupled to" may also be used herein to mean that a wire, trace, or other electrically conductive material is used to electrically connect elements A and B (and any components electrically connected therebetween). In some examples, the term "coupled to" mean a transfer of electrical energy between elements A and B, to operate certain intended functions.

In some examples, the term "electrically connected" mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus, comprising:
   a memory controller coupled to a memory module through a first channel and configured to store data in and access data stored in the memory module through the first channel, and configured to perform operations comprising:
   receiving, from a host device, data to be stored in a memory of the memory module;
   determining a row in the memory at which the data will be stored;
   determining, based on the row, an address associated with the row, wherein the address indicates one bit location in the row at which data will not be stored; and
   storing the data at the row in accordance with the address by adjusting a shift position of a multiplexer for storing the data at the row to bypass the one bit location based on the determined address, wherein the data is not stored at the one bit location.

2. The apparatus of claim 1, wherein the address comprises a redundancy address (RA).

3. The apparatus of claim 2, wherein to determine the address, the memory controller is further configured to perform operations comprising:
   determining the row in the memory at which data will be stored; and
   reading the address associated with the row in the memory at which data will be stored from a cache tag array of the memory module.

4. The apparatus of claim 3, wherein to read the address associated with the row in the memory at which data will be stored from a cache tag array of the memory module, the memory controller is further configured to perform operations comprising:
   determining a first bit location in a row of the tag array at which the address is stored is faulty;
   determining a second bit location at which a repair bit of the address corresponding to the first bit location is stored; and
   reading the repair bit from the second bit location.

5. The apparatus of claim 1, wherein the memory of the memory module comprises a single spare column.

6. The apparatus of claim 1, wherein the memory controller is further configured to perform operations comprising:
determining a disabled row of the memory based on a line disable indication stored in a cache tag array of the memory module,
wherein to determine the row in the memory at which the data will be stored, the memory controller is further configured to perform operations comprising determining not to store the data at the disabled row based on the determination of the disabled row.

7. The apparatus of claim 1, wherein the memory comprises a static random access memory (SRAM).

8. The apparatus of claim 1, wherein the address is further associated with one or more additional rows having a corresponding bit location at which data will not be stored.

9. The apparatus of claim 1, wherein the one bit location is a faulty bit location.

10. A method, comprising:
receiving, by a memory controller coupled to a memory module through a first channel and configured to store data in and access data stored in the memory module through the first channel from a host device, data to be stored in a memory of the memory module;
determining, by the memory controller, a row in the memory at which the data will be stored;
determining, by the memory controller based on the row, an address associated with the row, wherein the address indicates one bit location in the row at which data will not be stored; and
storing, by the memory controller, the data at the row in accordance with the address by adjusting a shift position of a multiplexer for storing the data at the row to bypass the one bit location based on the determined address, wherein the data is not stored at the one bit location.

11. The method of claim 10, wherein the address comprises a redundancy address (RA).

12. The method of claim 11, wherein to determining the address comprises:
determining, by the memory controller, the row in the memory at which data will be stored; and
reading, by the memory controller, the address associated with the row in the memory at which data will be stored from a cache tag array of the memory module.

13. The method of claim 11, wherein reading the address associated with the row in the memory at which data will be stored from a cache tag array of the memory module comprises:
determining a first bit location in a row of the tag array at which the address is stored is faulty;
determining a second bit location at which a repair bit of the address corresponding to the first bit location is stored; and
reading the repair bit from the second bit location.

14. The method of claim 10, wherein the memory of the memory module comprises a single spare column.

15. The method of claim 10, further comprising:
determining, by the memory controller, a disabled row of the memory based on a line disable indication stored in a cache tag array of the memory module,
wherein determining the row in the memory at which the data will be stored comprises determining not to store the data at the disabled row based on the determination of the disabled row.

16. The method of claim 10, wherein the memory comprises a static random access memory (SRAM).

17. The method of claim 10, wherein the address is further associated with one or more additional rows having a corresponding bit location at which data will not be stored.

18. The method of claim 10, wherein the one bit location is a faulty bit location.

19. An apparatus, comprising:
a memory controller coupled to a memory module through a first channel and configured to store data in and access data stored in the memory module through the first channel, and configured to perform operations comprising:
receiving, from a host device, a request to read data stored in a memory of the memory module;
determining a row in the memory at which the data is stored;
determining, based on the row, an address associated with the row, wherein the address indicates one bit location in the row at which the data is not stored; and
reading the data at the row in accordance with the address by adjusting a shift position of a multiplexer for reading the data at the row to bypass the one bit location based on the determined address, wherein the data is not stored at the one bit location.

20. The apparatus of claim 19, wherein the address comprises a redundancy address (RA).

21. The apparatus of claim 19, wherein to determine the address, the memory controller is further configured to perform operations comprising:
determining the row in the memory at which data is stored; and
reading the address associated with the row in the memory at which data is stored from a cache tag array of the memory module.

22. The apparatus of claim 21, wherein to read the address associated with the row in the memory at which data is stored from a cache tag array of the memory module, the memory controller is further configured to perform operations comprising:
determining a first bit location in a row of the tag array at which the address is stored is faulty;
determining a second bit location at which a repair bit of the address corresponding to the first bit location is stored; and
reading the repair bit from the second bit location.

23. The apparatus of claim 19, wherein the memory controller is further configured to perform operations comprising:
determining a disabled row of the memory based on a line disable indication stored in a cache tag array of the memory module,
wherein to determine the row in the memory at which the data is stored, the memory controller is further configured to perform operations comprising determining not to read the data at the disabled row based on the determination of the disabled row.

24. An method, comprising:
receiving, by a memory controller coupled to a memory module through a first channel and configured to store data in and access data stored in the memory module through the first channel from a host device, a request to read data stored in a memory of the memory module;
determining, by the memory controller a row in the memory at which the data is stored;

determining, by the memory controller based on the row, an address associated with the row, wherein the address indicates one bit location in the row at which the data is not stored; and reading, by the memory controller, the data at the row in accordance with the address by adjusting a shift position of a multiplexer for reading the data at the row to bypass the one bit location based on the determined address, wherein the data is not stored at the one bit location.

25. The method of claim 24, wherein the address comprises a redundancy address (RA).

26. The method of claim 25, wherein determining the address comprises:

determining, by the memory controller the row in the memory at which data is stored; and reading, by the memory controller the address associated with the row in the memory at which data is stored from a cache tag array of the memory module.

27. The method of claim 26, wherein reading the address associated with the row in the memory at which data is stored from a cache tag array of the memory module comprises:

determining, by the memory controller a first bit location in a row of the tag array at which the address is stored is faulty;

determining, by the memory controller a second bit location at which a repair bit of the address corresponding to the first bit location is stored; and reading the repair bit from the second bit location.

28. The method of claim 24, further comprising:

determining, by the memory controller a disabled row of the memory based on a line disable indication stored in a cache tag array of the memory module, wherein determining the row in the memory at which the data is stored comprises determining not to read the data at the disabled row based on the determination of the disabled row.

* * * * *